(12) United States Patent
Arnold et al.

(10) Patent No.: US 10,689,252 B2
(45) Date of Patent: Jun. 23, 2020

(54) MONODISPERSE SINGLE-WALLED CARBON NANOTUBE POPULATIONS AND RELATED METHODS FOR PROVIDING SAME

(71) Applicant: Northwestern University, Evanston, IL (US)

(72) Inventors: Michael S. Arnold, Ann Arbor, MI (US); Mark C. Hersam, Wilmette, IL (US); Samuel I. Stupp, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 15/903,661

(22) Filed: Feb. 23, 2018

(65) Prior Publication Data

US 2018/0251371 A1    Sep. 6, 2018

Related U.S. Application Data

(60) Division of application No. 12/959,990, filed on Dec. 3, 2010, now Pat. No. 9,926,195, which is a
(Continued)

(51) Int. Cl.
*H01B 1/02* (2006.01)
*B82Y 30/00* (2011.01)
(Continued)

(52) U.S. Cl.
CPC ............... *B82Y 30/00* (2013.01); *B82Y 40/00* (2013.01); *C01B 32/172* (2017.08);
(Continued)

(58) Field of Classification Search
CPC ............ C01B 31/0266; C01B 2202/22; C01B 2202/30; C01B 32/172; H01B 1/02; H01B 1/04; B82Y 40/00
(Continued)

(56) References Cited

U.S. PATENT DOCUMENTS

| 6,232,706 B1 | 5/2001 | Dai et al. |
| 6,591,658 B1 | 7/2003 | Yedur et al. |

(Continued)

FOREIGN PATENT DOCUMENTS

| EP | 1284236 A1 | 2/2003 |
| EP | 1612187 A1 | 1/2006 |

(Continued)

OTHER PUBLICATIONS

Arnold et al., "Enrichment of Single-Walled Carbon Nanotubes by Diameter in Density Gradients," *Nano Letters*, 5(4):713-718 (2005).
(Continued)

*Primary Examiner* — Tri V Nguyen
(74) *Attorney, Agent, or Firm* — Goodwin Procter LLP

(57) ABSTRACT

The present teachings provide methods for providing populations of single-walled carbon nanotubes that are substantially monodisperse in terms of diameter, electronic type, and/or chirality. Also provided are single-walled carbon nanotube populations provided thereby and articles of manufacture including such populations.

30 Claims, 20 Drawing Sheets

Related U.S. Application Data continuation of application No. 11/897,129, filed on Aug. 29, 2007, now abandoned.

(60) Provisional application No. 60/840,990, filed on Aug. 30, 2006.

(51) Int. Cl.
    *B82Y 40/00* (2011.01)
    *C01B 32/172* (2017.01)

(52) U.S. Cl.
    CPC ...... *C01B 2202/02* (2013.01); *C01B 2202/22* (2013.01); *C01B 2202/36* (2013.01)

(58) Field of Classification Search
    USPC ...... 252/502, 500; 423/445 B; 977/750, 845, 977/751
    See application file for complete search history.

(56) References Cited

U.S. PATENT DOCUMENTS

| | | |
|---|---|---|
| 6,669,918 B2 | 12/2003 | Schleier-Smith et al. |
| 6,706,566 B2 | 3/2004 | Avouris et al. |
| 6,749,826 B2 | 6/2004 | Tillotson et al. |
| 6,905,667 B1 | 6/2005 | Chen et al. |
| 6,936,233 B2 | 8/2005 | Smalley et al. |
| 6,936,322 B2 | 8/2005 | Sakakibara et al. |
| 6,974,927 B2 | 12/2005 | Hannah |
| 7,038,299 B2 | 5/2006 | Furukawa et al. |
| 7,070,754 B2 | 7/2006 | Smalley et al. |
| 7,074,310 B2 | 7/2006 | Smalley et al. |
| 7,074,379 B2 | 7/2006 | Moy et al. |
| 7,098,151 B2 | 8/2006 | Moriya et al. |
| 7,115,864 B2 | 10/2006 | Colbert et al. |
| 7,118,693 B2 | 10/2006 | Glatkowski et al. |
| 7,131,537 B2 | 11/2006 | Papadimitrakopoulos |
| 7,166,266 B2 | 1/2007 | Nikolaev et al. |
| 7,247,670 B2 | 7/2007 | Malenfant et al. |
| 7,261,852 B2 | 8/2007 | Rinzler et al. |
| 7,354,563 B2 | 4/2008 | Smalley et al. |
| 7,357,906 B2 | 4/2008 | Colbert et al. |
| 7,374,685 B2 | 5/2008 | Sun |
| 7,390,477 B2 | 6/2008 | Smalley et al. |
| 7,662,298 B2 | 2/2010 | Hersam et al. |
| 2001/0050219 A1 | 12/2001 | Anazawa et al. |
| 2003/0168385 A1 | 9/2003 | Papadimitrakopoulos |
| 2003/0199100 A1 | 10/2003 | Wick |
| 2004/0040834 A1 | 3/2004 | Smalley et al. |
| 2004/0106184 A1 | 6/2004 | Senesac |
| 2004/0191157 A1 | 9/2004 | Harutyunyan et al. |
| 2004/0197546 A1 | 10/2004 | Rinzler et al. |
| 2004/0232073 A1 | 11/2004 | Papadimitrakopoulos |
| 2004/0241079 A1 | 12/2004 | Takenobu et al. |
| 2004/0245088 A1 | 12/2004 | Gardner |
| 2005/0009039 A1 | 1/2005 | Jagota et al. |
| 2005/0070657 A1* | 3/2005 | Elkovitch ............... B82Y 30/00 524/495 |
| 2005/0129382 A1 | 6/2005 | Sakakibara et al. |
| 2005/0254760 A1 | 11/2005 | Sakakibara et al. |
| 2005/0255031 A1 | 11/2005 | Jung et al. |
| 2006/0040381 A1 | 2/2006 | Zhao et al. |
| 2006/0045838 A1 | 3/2006 | Lucien Malenfant et al. |
| 2006/0054555 A1 | 3/2006 | Sun |
| 2006/0057290 A1 | 3/2006 | Glatkowski |
| 2006/0081882 A1 | 4/2006 | Malenfant et al. |
| 2006/0113510 A1 | 6/2006 | Luo et al. |
| 2006/0231399 A1 | 10/2006 | Smalley et al. |
| 2006/0240238 A1 | 10/2006 | Boussaad et al. |
| 2006/0242741 A1 | 10/2006 | Krupke et al. |
| 2006/0274049 A1 | 12/2006 | Spath et al. |
| 2007/0045119 A1 | 3/2007 | Sandhu |
| 2007/0062411 A1 | 3/2007 | Weisman et al. |
| 2007/0224106 A1 | 9/2007 | Sakakibara et al. |
| 2007/0258880 A1 | 11/2007 | Murakoshi |
| 2008/0217588 A1 | 9/2008 | Arnold et al. |
| 2008/0258117 A1 | 10/2008 | Sakakibara et al. |
| 2008/0308772 A1 | 12/2008 | Akasaka et al. |
| 2009/0061194 A1 | 3/2009 | Green et al. |
| 2010/0176349 A1* | 7/2010 | Schmidt ............... B82Y 30/00 252/502 |
| 2011/0024333 A1 | 2/2011 | Han et al. |

FOREIGN PATENT DOCUMENTS

| | | |
|---|---|---|
| JP | 2001-348215 A | 12/2001 |
| JP | 2003-095626 A | 4/2003 |
| JP | 2003-128406 A | 5/2003 |
| JP | 2004-210608 A | 7/2004 |
| JP | 2005-104750 A | 4/2005 |
| JP | 2005-325020 A | 11/2005 |
| JP | 2006-36630 A | 2/2006 |
| JP | 2006-054377 A | 2/2006 |
| JP | 2006-188379 A | 7/2006 |
| JP | 2006-188380 A | 7/2006 |
| JP | 2007-519594 A | 7/2007 |
| JP | 2008-231210 A | 10/2008 |
| JP | 2008-266111 A | 11/2008 |
| JP | 2008-285386 A | 11/2008 |
| JP | 2008-285387 A | 11/2008 |
| WO | WO-2002/23177 A1 | 3/2002 |
| WO | WO-2001/94605 A3 | 12/2002 |
| WO | WO-2002/23178 A9 | 4/2003 |
| WO | WO-2003/084869 A8 | 2/2004 |
| WO | WO-2004/082794 A3 | 3/2005 |
| WO | WO-2004/048255 A3 | 6/2005 |
| WO | WO-2004/069736 A3 | 6/2005 |
| WO | WO-2004/108591 A3 | 8/2005 |
| WO | WO-2005/041227 A3 | 8/2005 |
| WO | WO-2005/077827 A1 | 8/2005 |
| WO | WO-2005/069789 A3 | 2/2006 |
| WO | WO-2006/013788 A1 | 2/2006 |
| WO | WO-2005/012172 A3 | 3/2006 |
| WO | WO-2006/026539 A3 | 5/2006 |
| WO | WO-2006/075968 A1 | 7/2006 |
| WO | WO-2005/116757 A3 | 10/2006 |
| WO | WO-2006/137943 A9 | 3/2007 |
| WO | WO-2005/122285 A3 | 8/2007 |
| WO | WO-2006/096613 A3 | 9/2007 |
| WO | WO-2008/010383 A1 | 1/2008 |
| WO | WO-2008/038007 A3 | 5/2008 |
| WO | WO-2008/057070 A3 | 7/2008 |
| WO | WO-2008/143281 A1 | 11/2008 |
| WO | WO-2008/057108 A3 | 3/2009 |

OTHER PUBLICATIONS

Arnold et al., "Hydrodynamic characterization of surfactant encapsulated carbon nanotubes using an analytical ultracentrifuge," *ACS Nano*, Oct. 3, 2008 (web).

Arnold et al., "Sorting carbon nanotubes by electronic structure using density differentiation," *Nature Nanotechnology*, 1:60-65 (2006).

Chattopadhyay et al., "A Route for Bulk Separation of Semiconducting from Metallic Single-Wall Carbon Nanotubes," *J. Am. Chem. Soc.*, 125:3370-3375 (2003).

Chen et al., "Dissolution of Full-Length Single-Walled Carbon Nanotubes," *J. Phys. Chem. B.*, 105(13):2525-2528 (2001).

Chen, "Low-Defect, Purified, Narrowly (n,m)-Dispersed Single-Walled Carbon Nanotubes Grown from Cobalt-Incorporated MGM-41," *ACSNano*, 1(4):327-336 (2007).

Freiman et al., "Measurement Issues in Single Wall Carbon Nanotubes" *National Institute of Standards and Technology*, Spec. Publ. 960-19:1-72 (2008).

Fujimori et al., "Conducting linear chains of sulphur inside carbon nanotubes," *Nature Communications*, 4:2162 doi:10.1038/ncomms3162 (2013).

Green et al., "Colored semitransparent conductive coatings consisting of monodisperse metallic single-walled carbon nanotubes," *Nano Lett.*, 8(5):1417-1422 (2008).

(56) References Cited

OTHER PUBLICATIONS

Green et al., "Ultracentrifugation of single-walled carbon nanotubes," *Materials Today*, 10(12):59-60 (2007).

Heller et al., "Concomitant Length and Diameter Separation of Single-Walled Carbon Nanotubes," *J. Am. Chem. Soc.*, 126(44):14567-14573 (2004).

Hersam, "Progress towards monodisperse single-walled carbon nanotubes" *Nature Nanotechnology*, 3:387-394 (2008).

Hojati-Talemi et al., "Effect of different microwave-based treatments on multi-walled carbon nanotubes," *J. Nanopart. Res.*, 12:393-403 (2010).

Huang, "9 9.9% purity multi-walled carbon nanotubes by vacuum high-temperature annealing," Carbon, 41:2585-2590 (2003).

Journet et al., "Large-scale production of single-walled carbon nanotubes by the electric-arc technique," *Nature*, 388:756-8 (Aug. 21, 1997).

Kolmogorov et al., "Nanotube-Substrate Interactions: Distinguishing Carbon Nanotubes by the Helical Angle," *Physical Review Letters*, 92(8):085503-1-085503-4 (2004).

Krupke et al., "Separation of Metallic from Semiconducting Single-Walled Carbon Nanotubes," *Science*, 301:344-347 (Jul. 18, 2003).

Li et al., "Selective Interactions of Porphyrins with Semiconducting Single-Walled Carbon Nanotubes," *J. Am. Chem. Soc.*, 126:1014-1015 (2004) (with Supporting Information (5 pages)).

M. S. Arnold, "Carbon nanotubes: Photophysics, biofunctionalization, and sorting via density differentiation," PhD Thesis, Northwestern University, Dec. 2006.

Maeda et al., "Large-Scale Separation of Metallic and Semiconducting Single-Walled Carbon Nanotubes," *J. Am. Chem. Soc.*, 127:10287-10290 (2005).

Maehashi, et al., "Chirality selection of single-walled carbon nanotubes by laser resonance chirality selection method," *Applied Physics Letters*, Aug. 9, 2004, vol. 85, No. 6, 858-860.

Niyogi et al., "Chemistry of Single-Walled Carbon Nanotubes," *Acc. Chem. Res.*, 35:1105-1113 (2002).

Panhuis et al., "Characterization of an Interaction between Functionalized Carbon Nanotubes and an Enzyme," *Journal of Nanoscience and Nanotechnology*, 3(3):209-213 (2003).

Samsonidze et al., "Quantitative evaluation of the octadecylamine-assisted bulk separation of semiconducting and metallic single-wall carbon nanotubes by resonance Raman spectroscopy," *Applied Physics Letters*, 85(6):1006-1008 (2004).

Shim et al., "Preferential elimination of metallic single-walled carbon nanotubes using microwave irradiation," *Nanotechnology*, 20:1-5 (2009).

Strano et al., "Understanding the Nature of the DNA-Assisted Separation of Single-Walled Carbon Nanotubes Using Fluorescence and Raman Spectroscopy," *Nano. Lett.*, 2004, vol. 4, No. 4, 543-550.

Sugai, "Chirality Selection of Carbon Nanotubes using DNA," *Chemistry & Chemical Industry*, Jun. 1, 2004, vol. 57, No. 6, p. 622 (Abstract).

Wenseleers et al., "Efficient Isolation and Solubilization of Pristine Single-Walled Nanotubes in Bile Salt Micelles," *Advanced Functional Material*, 14(11):1105-1112 (2004).

Wu et al., "Transparent, Conductive Carbon Nanotube Films," *Science* 305:1273-1276 (2004).

Zhang et al., "Selective Etching of Metallic Carbon Nanotubes by Gas-Phase Reaction," *Science*, 314:974-977 (2006).

Zhang et al., "Transparent, Conductive, and Flexible Carbon Nanotube Films and Their Application in Organic Light-Emitting Diodes," *Nano. Letters*, 6(9):1880-1886 (2006).

Zheng et al., "DNA-assisted dispersion and separation of carbon nanotubes," *Nature Materials*, 2003 vol. 2, 338-342.

Zhou et al., "p-Channel, n-Channel Thin Film Transistors and p-n Diodes Based on Single Wall Carbon Nanotube Networks," *Nano Letters*, 4(10):2031-5, web pub Aug. 26, 2004.

Zhou et al., "A method of printing carbon nanotube thin films," *Applied Physics Letters* 88:123109-1-123109-3 (2006).

Haroz et al., "Enrichment of Armchair Carbon Nanotubes via Density Gradient Ultracentrifugation: Raman Spectroscopy Evidence," *ACS Nano*, 4(4):1955-1962 (2010).

Yanagi et al., "Optical and Conductive Characteristics of Metallic Single-Wall Carbon Nanotubes with Three Basic Colors; Cyan, Magenta, and Yellow," *Applied Physics Express*, 1:034003-1-034003-3 (2008).

\* cited by examiner

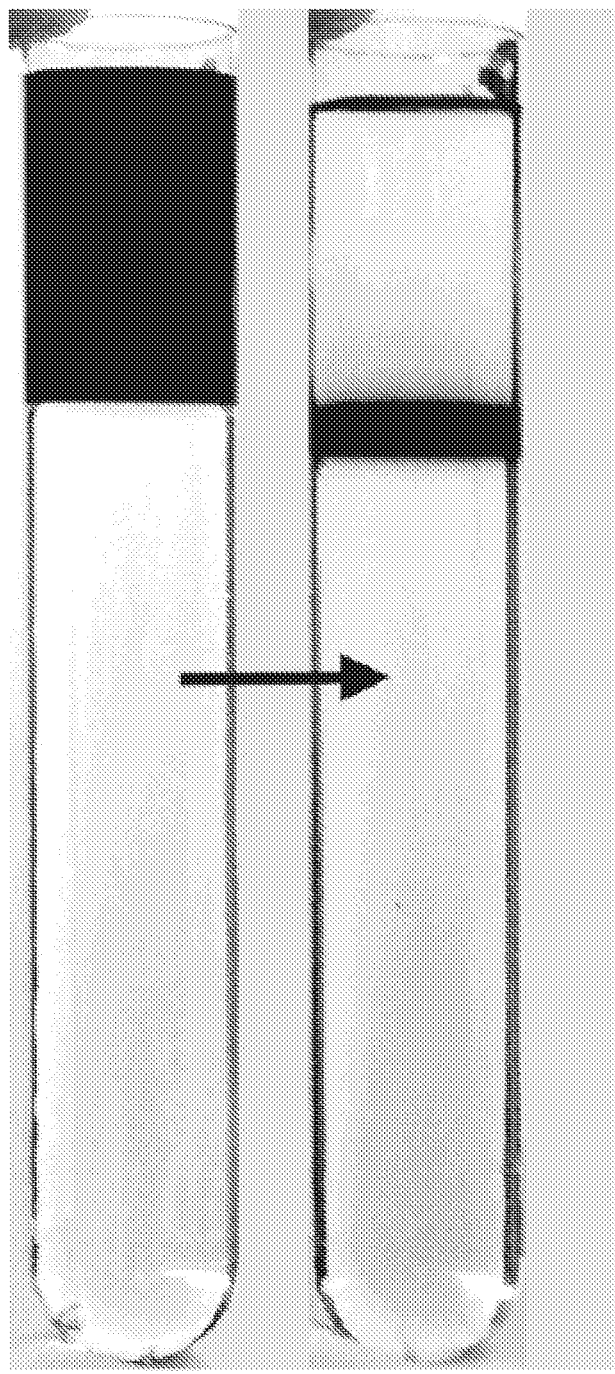

FIG. 9A
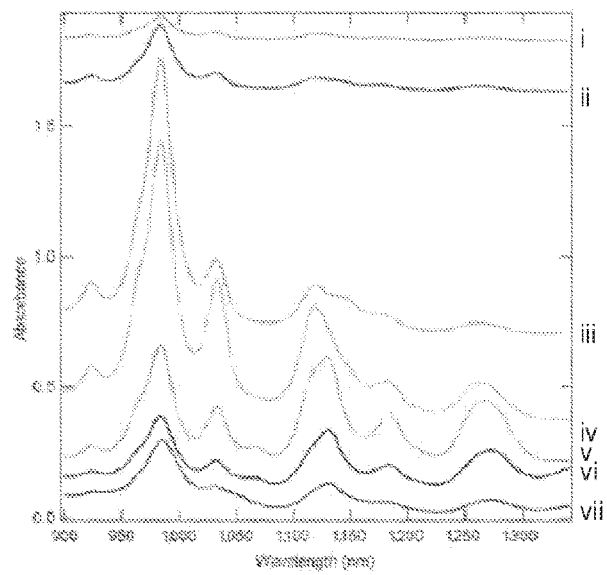
FIG. 9B
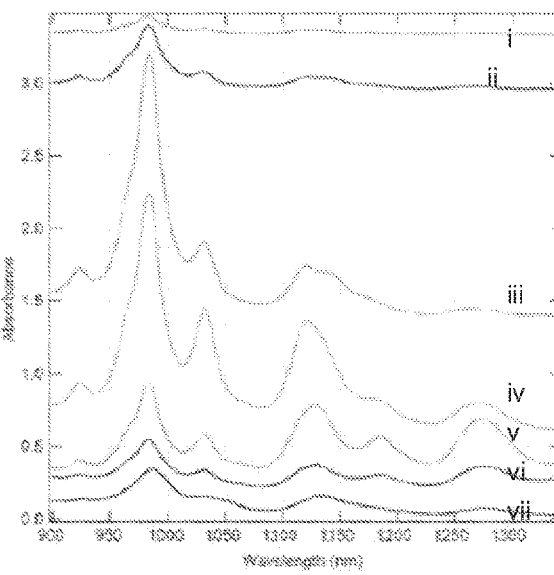
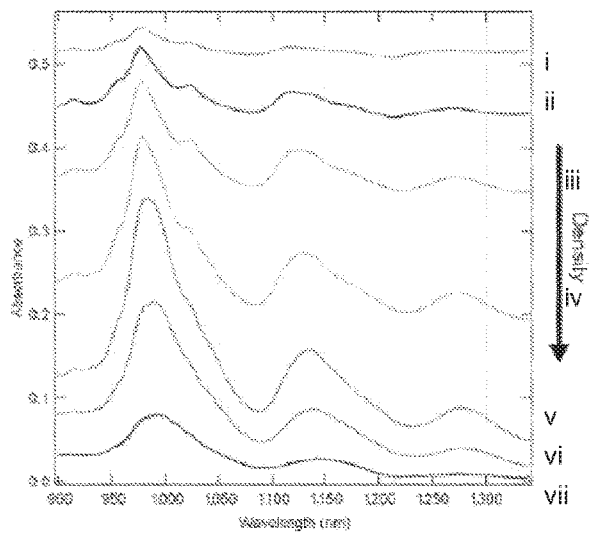
FIG. 9C

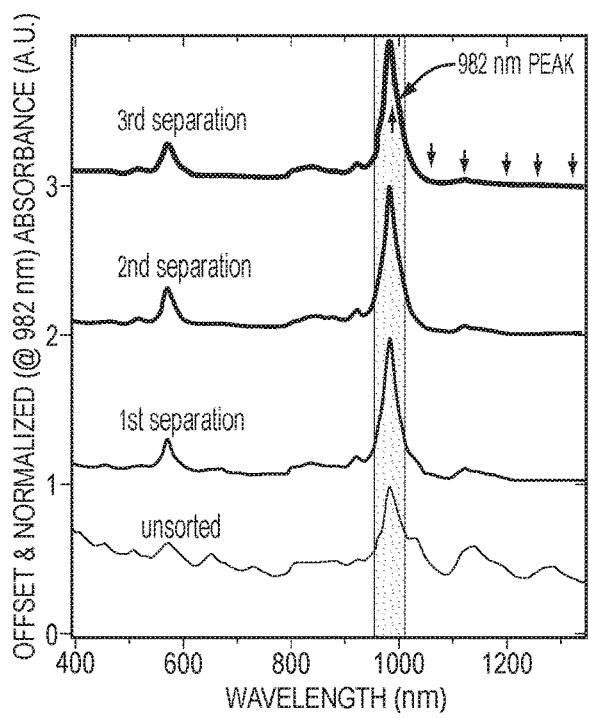 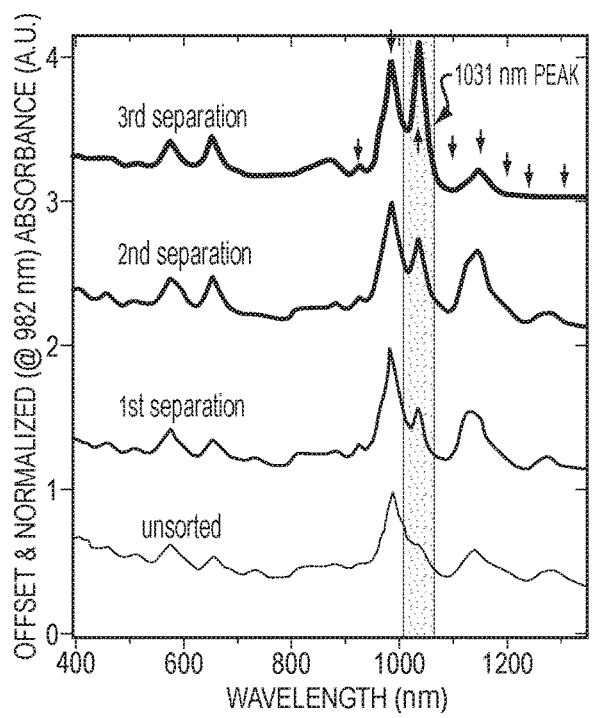
FIG. 13A
FIG. 13B

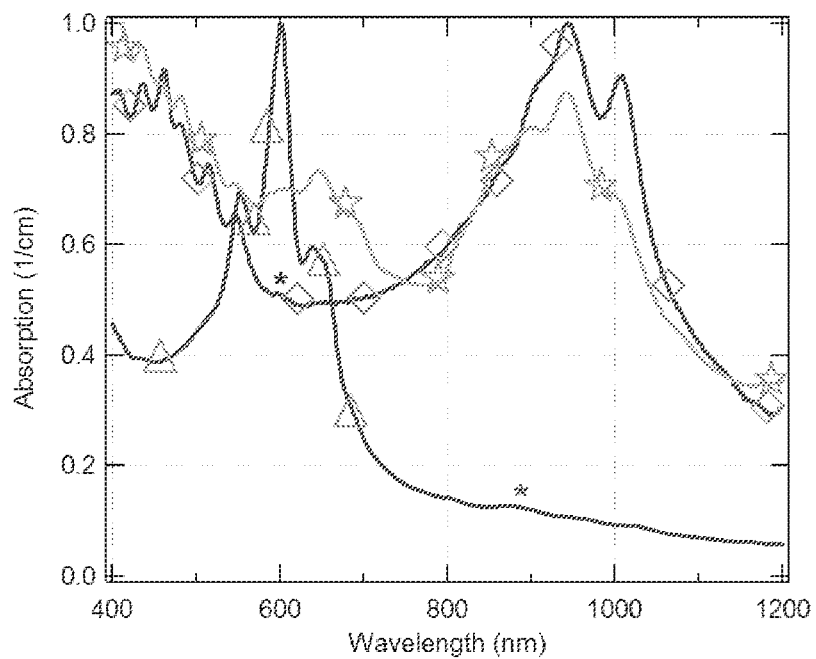
FIG. 20
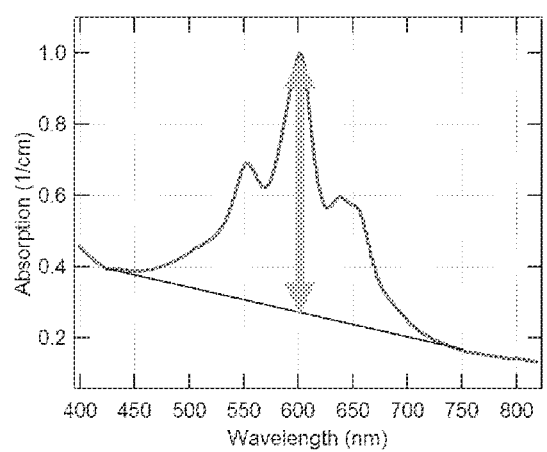 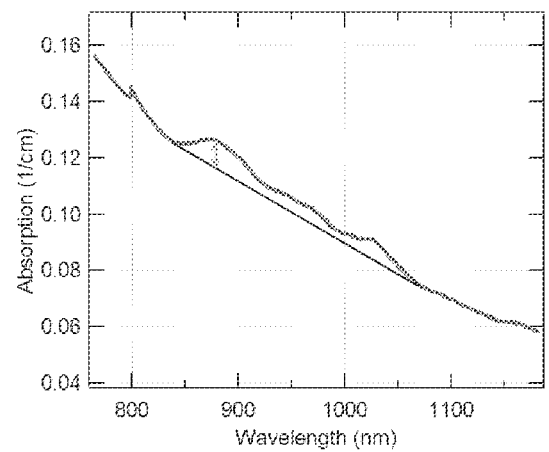
FIG. 21A　　　　　　　　　　FIG. 21B

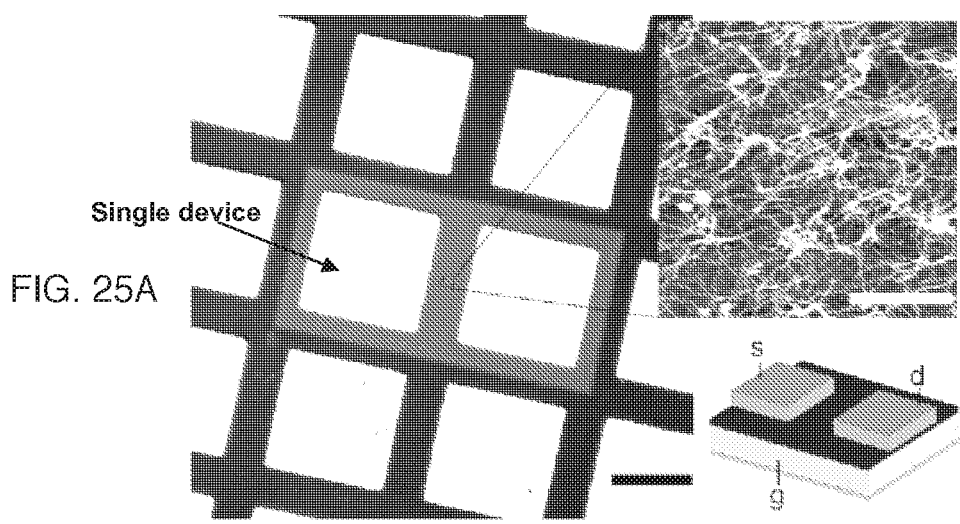
FIG. 25A  
Single device  
FIG. 25B  
FIG. 25C
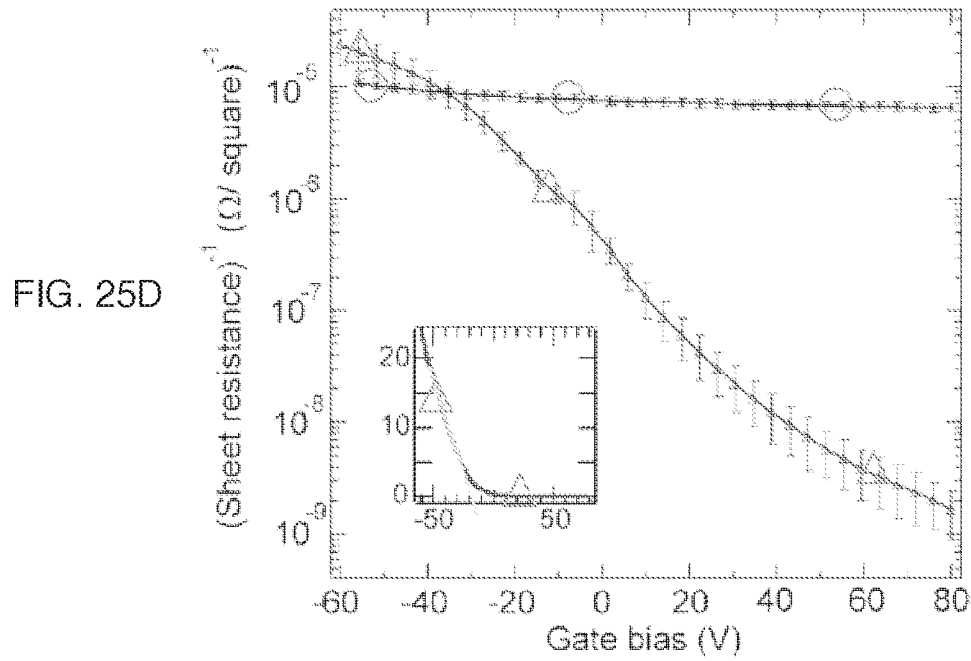
FIG. 25D

MONODISPERSE SINGLE-WALLED CARBON NANOTUBE POPULATIONS AND RELATED METHODS FOR PROVIDING SAME

CROSS-REFERENCE TO RELATED APPLICATIONS

This application is a divisional patent application under 35 U.S.C. §§ 120 and 121 of U.S. patent application Ser. No. 12/959,990, filed on Dec. 3, 2010, which application is a continuation of U.S. patent application Ser. No. 11/897,129, filed on Aug. 29, 2007, which claims priority to and the benefit of U.S. Provisional Patent Application Ser. No. 60/840,990, filed on Aug. 30, 2006, the disclosure of each of which is incorporated by reference in its entirety.

STATEMENT REGARDING FEDERALLY SPONSORED RESEARCH OR DEVELOPMENT

This invention was made with government support under Grant Numbers EEC-0118025 and DMR-0134706 awarded by the National Science Foundation, and Grant Number DE-FG02-00ER54810 awarded by the Department of Energy. The government has certain rights in the invention.

INTRODUCTION

Carbon nanotubes have recently received extensive attention due to their nanoscale dimensions and outstanding materials properties such as ballistic electronic conduction, immunity from electromigration effects at high current densities, and transparent conduction. However, as-synthesized carbon nanotubes vary in their diameter and chiral angle, and these physical variations result in striking changes in their electronic and optical behaviors. For example, about one-third of all possible single-walled carbon nanotubes (SWNTs) exhibit metallic properties while the remaining two-thirds act as semiconductors. Moreover, the band gap of semiconducting SWNTs scales inversely with tube diameter. For instance, semiconducting SWNTs produced by the laser-ablation method range from about 11 Å to about 16 Å in diameter and have optical band gaps that vary from about 0.65 eV to about 0.95 eV. The unavoidable structural heterogeneity of the currently available as-synthesized SWNTs prevents their widespread application as high-performance field-effect transistors, optoelectronic near-infrared emitters/detectors, chemical sensors, materials for interconnects in integrated circuits, and conductive additives in composites. Accordingly, the utilization of SWNTs will be limited until large quantities of monodisperse SWNTs can be produced or otherwise obtained.

While several SWNT purification methods have been recently demonstrated, no pre-existing technique has been reported that simultaneously achieves diameter and band gap selectivity over a wide range of diameters and band gaps, electronic type (metal versus semiconductor) selectivity, and scalability. Furthermore, most techniques are limited in effectiveness, and many are only sensitive to SWNTs that are less than about 11 Å in diameter. This is a significant limitation because the SWNTs that are most important for electronic devices are generally ones that are larger in diameter, since these form less resistive contacts (i.e. reduced Schottky barriers). The methods of dielectrophoresis and controlled electrical breakdown are both limited in scalability and are only sensitive to electronic type (not diameter or band gap). Furthermore, the selective chemical reaction of diazonium salts with metallic SWNTs has only been demonstrated for SWNTs in the 7-12 Å diameter range, and this approach does not provide diameter and band gap selectivity. More problematically, the chemistry also results in the covalent degradation of the nanotube sidewalls. In addition, the use of amine-terminated surfactants in organic solvents is limited to the production of samples that are only 92% semiconducting, and the technique has been successfully applied only to SWNTs having a diameter of less than or about 10 Å. Similarly, while diameter and electronic type selectivity have been observed using anion exchange chromatography, such approach has only been demonstrated for SWNTs wrapped by specific oligomers of DNA ranging from 7-11 Å in diameter.

SUMMARY

In light of the foregoing, it is an object of the present teachings to provide compositions including carbon nanotubes that are substantially monodisperse in their structure and/or properties, specifically with respect to diameter, band gap, chirality, and/or electronic type (metallic versus semiconducting). To provide such substantially monodisperse carbon nanotubes, the present teachings also relate to one or more methods and/or systems that can be used to separate structurally and/or characteristically heterogeneous carbon nanotubes, thereby addressing various deficiencies and shortcomings of the prior art, including those outlined above.

It will be understood by those skilled in the art that one or more embodiments of the present teachings can meet certain objectives, while one or more other embodiments can meet certain other objectives. Each objective may not apply equally, in all its respects, to every embodiment of the present teachings. As such, the following objects can be viewed in the alternative with respect to any one embodiment of the present teachings.

It can be another object of the present teachings to provide methods and related systems for carbon nanotube separation, regardless of diameter or length dimension, which are compatible with various nanotube production techniques and result in separation on a practical size-scale.

It can be another object of the present teachings to provide methods and related systems for carbon nanotube separation as a function of electronic type, regardless of diameter and/or chirality.

It can be another object of the present teachings to provide methods and related systems for carbon nanotube separation as a function of diameter, regardless of chirality and/or electronic type.

It can be another object of the present teachings to provide methods and related systems for carbon nanotube separation as a function of chirality, which can be associated with specific diameters and/or an electronic type.

It can be another object of the present teachings to provide a range of surface active components and use thereof to engineer differences in the buoyant densities of the complexes formed by the surface active component(s) and a heterogeneous sample of carbon nanotubes, such that the nanotubes can be separated as a function of structure and/or properties including but not limited to chiralities, diameter, band gap, and/or electronic type.

It can be another object of the present teachings to provide such separation methods and systems which can be used in conjunction with existing automation and can be scaled for production of commercially-useful quantities.

Other objects, features, and advantages of the present teachings will be apparent from the summary and the following description of certain embodiments, which will be readily apparent to those skilled in the art knowledgeable of the production and properties of carbon nanotubes and related separation techniques. Such objects, features, benefits and advantages will be apparent from the above as taken into conjunction with the accompanying examples, data, figures and all reasonable inferences to be drawn there from, alone or with consideration of the references incorporated herein.

In part, the present teachings are directed to a method of using a density gradient to separate single-walled carbon nanotubes, wherein the density gradient is provided by a fluid medium. Such a method can include centrifuging a fluid medium including a density gradient and a composition including a first surface active component, a second surface active component and a mixture of single-walled carbon nanotubes to separate the mixture along the density gradient, and isolating from the fluid medium a separation fraction that includes separated single-walled carbon nanotubes. More specifically, the mixture of single-walled carbon nanotubes can include a range of nanotube diameter dimensions, chiralities and/or electronic types, and the ratio of the first surface active component to the second surface active component can be other than 4:1.

As described herein, it should be understood that isolating a separation fraction typically provides complex(es) formed by the surface active component(s) and the mixture of single-walled carbon nanotubes where post-isolation treatment, e.g., removing the surface active component(s) from the SWNTs such as by washing, dialysis and/or filtration, can provide substantially pure or bare single-walled carbon nanotubes. However, as used herein for brevity, reference may be made to a mixture of single-walled carbon nanotubes rather than the complexes and such reference should be interpreted to include the complexes as understood from the context of the description unless otherwise stated that non-complexed single-walled carbon nanotubes, e.g., bare SWNTs, are meant.

In some embodiments, the first surface active component can be a bile salt and the second surface active component can be an anionic alkyl amphiphile. The fluid medium and the composition can be centrifuged for a time and/or at a rotational rate sufficient to at least partially separate the mixture along the density gradient. Such a method is without limitation as to separation by nanotube diameter dimensions, chiralities and/or electronic type. In some embodiments, single-walled carbon nanotubes in the mixture can independently have diameter dimensions up to about 20 Å or more. In certain embodiments, dimensions can range from about 7 Å to about 11 Å, while in certain other embodiments, dimensions can be greater than about 11 Å (for example, ranging from about 11 Å to about 16 Å). Without limitation, narrow distributions of separated single-walled carbon nanotubes can be provided in the separation fraction and subsequently isolated. For example, in some embodiments, greater than about 70% of the separated single-walled carbon nanotubes can be semiconducting. In other embodiments, greater than about 50% of the separated single-walled carbon nanotubes can be metallic. In some embodiments, the method can include post-isolation treatment of the separated single-walled carbon nanotubes to provide bare single-walled carbon nanotubes. In certain embodiments, the method can further include repeating the centrifuging and isolating steps using the separation fraction.

In part, the present teachings also are directed to a method of using a density gradient to separate single-walled carbon nanotubes based on electronic type, wherein the density gradient is provided by a fluid medium. Such a method can include centrifuging a fluid medium including a density gradient and a composition including a mixture of single-walled carbon nanotubes (including both semiconducting single-walled carbon nanotubes and metallic single-walled carbon nanotubes) and at least two surface active components (e.g., a first surface active component and a second surface active component) to separate the mixture along the density gradient, and isolating from the fluid medium a substantially semiconducting separation fraction or a substantially metallic separation fraction. As used herein, a substantially semiconducting separation fraction refers to a separation fraction that includes a majority of or a high concentration or percentage of semiconducting single-walled carbon nanotubes. For example, the substantially semiconducting separation fraction can include a higher concentration or percentage of semiconducting single-walled carbon nanotubes than the mixture. Similarly, as used herein, a substantially metallic separation fraction refers to a separation fraction that includes a majority of or a high concentration or percentage of metallic single-walled carbon nanotubes. For example, the substantially metallic separation fraction can include a higher concentration or percentage of metallic single-walled carbon nanotubes than the mixture. In some embodiments, the separation fraction isolated after centrifugation can be substantially semiconducting. In other embodiments, the separation fraction isolated after centrifugation can be substantially metallic. For example, in some embodiments, greater than about 70% of the single-walled carbon nanotubes in the separation fraction can be semiconducting single-walled carbon nanotubes. In other embodiments, greater than about 50% of the single-walled carbon nanotubes in the separation fraction can be metallic single-walled carbon nanotubes. The fluid medium and the mixture can be centrifuged for a time and/or at a rotational rate sufficient to at least partially separate the mixture (i.e., complexes) along the density gradient. In some embodiments, single-walled carbon nanotubes in the mixture can independently have diameter dimensions up to about 20 Å or more. In certain embodiments, dimensions can range from about 7 Å to about 11 Å, while in certain other embodiments, dimensions can be greater than about 11 Å (for example, ranging from about 11 Å to about 20 Å or from about 11 Å to about 16 Å).

In some embodiments, the first surface active component can be a bile salt and the second surface active component can be an anionic alkyl amphiphile. In some embodiments, the method can include post-isolation treatment of the separated single-walled carbon nanotubes to provide bare single-walled carbon nanotubes. In certain embodiments, the method can include repeating the centrifuging and isolating steps using the separation fraction. For example, centrifugation of a first separation fraction can lead to a second separation by electronic type. The second separation can provide a second separation fraction that has a higher concentration or percentage of the desired electronic type compared to the first separation fraction. In addition to separation based on electronic type, the method can include further separation by nanotube diameter dimensions and/or chiralities, for example, by repeating the centrifuging and isolating steps using the separation fraction. In some embodiments, repeating the centrifuging and isolating steps using a substantially semiconducting separation fraction can provide subsequent separation fractions that predominantly include semiconducting single-walled carbon nanotubes of a predetermined range of narrow diameter dimensions (for example, a diameter dimension of about 7.6 Å, a diameter dimension of about 8.3 Å, a diameter dimension of about 9.8/10.3 Å, etc.).

In part, the present teachings are directed to a method of enriching a population of single-walled carbon nanotubes with semiconducting single-walled carbon nanotubes. Such a method can include isolating semiconducting single-walled carbon nanotubes from a mixture of semiconducting single-walled carbon nanotubes and metallic single-walled carbon nanotubes without irreversibly modifying the metallic single-walled carbon nanotubes. In some embodiments, the method can include separating the semiconducting single-walled carbon nanotubes from a mixture of semiconducting single-walled carbon nanotubes and metallic single-walled carbon nanotubes without irreversibly modifying the metallic single-walled carbon nanotubes (i.e., before isolating the semiconducting single-walled carbon nanotubes from the mixture).

In some embodiments, the method can include treatment of the enriched population to provide bare single-walled carbon nanotubes. In some embodiments, the method can include centrifuging the mixture of semiconducting single-walled carbon nanotubes and metallic single-walled carbon nanotubes. In certain embodiments, the method can provide a population of single-walled carbon nanotubes that includes at least 70% semiconducting single-walled carbon nanotubes. In addition to providing a population enriched with semiconducting single-walled carbon nanotubes, the method can further enrich the substantially semiconducting population with a predetermined range of nanotube diameter dimensions and/or chiralities. For example, the method can provide substantially semiconducting populations further enriched with a diameter dimension of about 7.6 Å, a diameter dimension of about 8.3 Å, a diameter dimension of about 9.8/10.3 Å, etc. In some embodiments, single-walled carbon nanotubes in the mixture (i.e., before separation) can independently have diameter dimensions up to about 20 Å or more. In certain embodiments, dimensions can range from about 7 Å to about 11 Å, while in certain other embodiments, dimensions can be greater than about 11 Å (for example, ranging from about 11 Å to about 20 Å or from about 11 Å to about 16 Å).

In part, the present teachings are directed to a method of enriching a population of single-walled carbon nanotubes with metallic single-walled carbon nanotubes. Such a method can include isolating metallic single-walled carbon nanotubes from a mixture of semiconducting single-walled carbon nanotubes and metallic single-walled carbon nanotubes. As previously mentioned, current methods for separating metallic single-walled carbon nanotubes from an electronically heterogeneous mixture were reported to cause degradation of the nanotube sidewalls. Accordingly, the present teachings further relate in part to a method of separating single-walled carbon nanotubes based on electronic type, wherein the method can provide a substantially metallic separation fraction that predominantly includes metallic single-walled carbon nanotubes that are structurally intact. In some embodiments, the method can include separating the metallic single-walled carbon nanotubes from a mixture of semiconducting single-walled carbon nanotubes and metallic single-walled carbon nanotubes (i.e., before isolating the metallic single-walled carbon nanotubes from the mixture).

In some embodiments, the method can include treatment of the enriched population to provide bare single-walled carbon nanotubes. In some embodiments, the method can include centrifuging the mixture of semiconducting single-walled carbon nanotubes and metallic single-walled carbon nanotubes. In certain embodiments, the method can provide a population of single-walled carbon nanotubes that includes at least 50% metallic single-walled carbon nanotubes. In addition to providing a population enriched with metallic single-walled carbon nanotubes, the method can further enrich the substantially metallic population with a predetermined range of nanotube diameter dimensions and/or chiralities. In some embodiments, single-walled carbon nanotubes in the mixture can independently have diameter dimensions up to about 20 Å or more. In certain embodiments, dimensions can range from about 7 Å to about 11 Å, while in certain other embodiments, dimensions can be greater than about 11 Å (for example, ranging from about 11 Å to about 20 Å or from about 11 Å to about 16 Å).

In part, the present teachings also are directed to a method of using a density gradient to isolate metallic single-walled carbon nanotubes from a mixture of semiconducting single-walled carbon nanotubes and metallic single-walled carbon nanotubes. The method can include providing a surface active component system, centrifuging a fluid medium including a density gradient and a composition including the surface active component system and a mixture of semiconducting single-walled carbon nanotubes and metallic single-walled carbon nanotubes to separate the mixture along the density gradient, and isolating from the fluid medium a substantially metallic separation fraction. More specifically, the surface active component system can include a first surface active component and a second surface active component, wherein the ratio of the first surface active component to the second surface active component is adjusted so that when the surface active component system is contacted and centrifuged with a mixture of single-walled carbon nanotubes, a substantially metallic SWNT-containing separation fraction that has a different density (e.g., is less dense or more dense) than another separation fraction that contains substantially semiconducting SWNTs. The fluid medium and the mixture can be centrifuged for a time and/or at a rotational rate sufficient to at least partially separate the mixture along the density gradient.

In some embodiments, the first surface active component can be a bile salt and the second surface active component can be an anionic alkyl amphiphile. In some embodiments, the ratio of the first surface active component to the second surface active component can be less than about one. In some embodiments, the method can include treatment, e.g., washing, of the substantially metallic separation fraction to provide bare metallic single-walled carbon nanotubes. In some embodiments, the method can include repeating the centrifuging and isolating steps using the substantially metallic separation fraction. For example, centrifugation of a first separation fraction can lead to a second separation by electronic type. The second separation can provide a second separation fraction that has a higher concentration or percentage of metallic single-walled carbon nanotubes compared to the first separation fraction. In addition to providing a substantially metallic separation fraction, the method can include further separation by nanotube diameter dimensions and/or chiralities, for example, by repeating the centrifuging and isolating steps using the substantially metallic separation fraction. In some embodiments, single-walled carbon nanotubes in the mixture can independently have diameter dimensions up to about 20 Å or more. In certain embodiments, dimensions can range from about 7 Å to about 11 Å, while in certain other embodiments, dimensions can be greater than about 11 Å (for example, ranging from about 11 Å to about 16 Å). In some embodiments, greater than about 50% of the single-walled carbon nanotubes in the separation fraction can be metallic.

In part, the present teachings are directed to a method of using a density gradient to isolate semiconducting single-walled carbon nanotubes from a mixture of metallic single-walled carbon nanotubes and semiconducting single-walled carbon nanotubes. The method can include providing a surface active component system, centrifuging a fluid medium including a density gradient and a composition including the surface active component system and a mixture of semiconducting single-walled carbon nanotubes and metallic single-walled carbon nanotubes to separate the mixture along the density gradient, and isolating from the fluid medium a substantially semiconducting separation fraction. More specifically, the surface active component system can include a first surface active component and a second surface active component, wherein the ratio of the first surface active component to the second surface active component is adjusted so that when the surface active component system is contacted and centrifuged with a mixture of single-walled carbon nanotubes, a substantially semiconducting SWNT-containing separation fraction that has a different density (e.g., is less dense or more dense) than another separation fraction that contains substantially metallic SWNTs. The fluid medium and the mixture can be centrifuged for a time and/or at a rotational rate sufficient to at least partially separate the mixture along the density gradient.

In some embodiments, the first surface active component can be a bile salt and the second surface active component can be an anionic alkyl amphiphile. In some embodiments, the ratio of the first surface active component to the second surface active component can be greater than about one. In some embodiments, the method can include treatment of the substantially semiconducting separation fraction to provide bare semiconducting single-walled carbon nanotubes. In some embodiments, the method can include repeating the centrifuging and isolating steps using the substantially semiconducting separation fraction. For example, centrifugation of a first separation fraction can lead to a second separation by electronic type. The second separation can provide a second separation fraction that has a higher concentration or percentage of semiconducting single-walled carbon nanotubes compared to the first separation fraction. In addition to providing a substantially semiconducting separation fraction, the method can include further separation by nanotube diameter dimensions and/or chiralities, for example, by repeating the centrifuging and isolating steps using the substantially semiconducting separation fraction, to provide subsequent separation fractions that predominantly contain semiconducting single-walled carbon nanotubes of a predetermined range of diameter dimensions (e.g., a diameter dimension of about 7.6 Å, a diameter dimension of about 8.3 Å, a diameter dimension of about 9.8/10.3 Å, etc.).

As demonstrated elsewhere herein, the nanotubes selectively separated can be identified spectrophotometrically and/or fluorimetrically, with such identification including comparison of absorbance and/or emission spectra respectively with a corresponding reference spectrum.

In part, the present teachings also are directed to a method of using a surface active component to alter carbon nanotube buoyant density. Such a method can include providing a fluid medium including a density gradient; contacting a mixture of single-walled carbon nanotubes varying by structure and/or electronic type with at least one surface active component, to provide differential buoyant density; contacting the medium and the composition mixture; centrifuging the medium and the composition for a time and/or at a rotational rate at least partially sufficient to separate the mixture (i.e., complexes) by buoyant density along the gradient; and selectively separating by structure and/or electronic type one group or portion of the nanotube mixture from the medium. Useful fluid medium and substances incorporated therein, together with surface active components, can be as described elsewhere herein. With regard to the latter, differential buoyant density can, optionally, be altered or modulated by a combination of two or more surface active components, where such contact and/or interaction can be a function of structure and/or electronic type.

The nanotubes can be of a diameter dimension increasing with gradient density and their position therealong. Those nanotubes selectively separated can include at least one chirality and/or at least one electronic type. Where such nanotubes include at least two chiralities, the selection can include iterative separation, as demonstrated elsewhere herein, to further partition the chiralities along a gradient. Where such nanotubes include a mixture of electronic types, the invention can include iterative separation, as demonstrated elsewhere herein, to further partition the electronic types along a gradient. In so doing, at least one such separation can vary by change in surface active component, medium composition or identity, medium density gradient, and/or medium pH, from one or more of the preceding separations.

In part, the present teachings can also be directed to a system for separation of carbon nanotubes. Such a system can include a fluid density gradient medium, and a composition including at least one surface active component and carbon nanotubes including a range of chiralities, diameter dimensions and/or electronic types, with the complexes of the surface active component(s) and nanotubes positioned along the gradient of the medium. Diameter dimensions are limited only by synthetic techniques used in nanotube production. Without limitation, diameter dimension can range from less than or about 4 Å to about 7 Å, to about 16 Å, or to about 20 Å, or greater. Likewise, the nanotubes in such a system are not limited by chirality or electronic type. Without limitation, such chiralities can be selected from any one or combination discussed herein. Independent of chirality, diameter or any other structural or physical characteristic, the nanotubes in such a system can be semiconducting and/or metallic. Regardless, a fluid density gradient medium and one or more surface active components, with or without a co-surfactant, can be selected in view of the considerations discussed elsewhere herein.

In certain embodiments, the nanotubes of such a system can be selectively separated by diameter and/or electronic type, such a characteristic as can correspond, by comparison using techniques described herein, to a respective manufacturing process and/or commercial source. Accordingly, carbon nanotubes separated in accordance with the present teachings (e.g., without limitation, single-walled carbon nanotubes) can be of and identified as substantially or predominantly semiconducting or metallic, or by a diameter ranging from about 7 Å to about 16 Å. Without limitation, selectivity available through use of methods of the present teachings can be indicated by separation of carbon nanotubes differing by diameters less than about 0.6 Å. As a further indication, the nanotubes of such an electronic type or within such a diameter range can be of substantially one (n,m) chirality or a mixture of (n,m) chiralities, where n and m denote chiral centers.

The present teachings further relate to populations of single-walled carbon nanotubes that are substantially monodisperse in terms of their structures and/or properties. In other words, such populations generally have narrow distributions of one or more predetermined structural or functional characteristics. For example, in some embodiments, the population can be substantially monodisperse in terms of their diameter dimensions (e.g., greater than about 75%, including greater than about 90% and greater than about 97%, of the single-walled carbon nanotubes in a population of single-walled carbon nanotubes can have a diameter within less than about 0.5 Å of the mean diameter of the population, greater than about 75%, including greater than about 90% and greater than about 97%, of the single-walled carbon nanotubes in a population of single-walled carbon nanotubes can have a diameter within less than about 0.2 Å of the mean diameter of the population, greater than about 75%, including greater than about 90% and greater than about 97%, of the single-walled carbon nanotubes in a population of single-walled carbon nanotubes can have a diameter within less than about 0.1 Å of the mean diameter of the population). In some embodiments, the population can be substantially monodisperse in terms of their electronic type (e.g., greater than about 70%, including greater than about 75%, greater than about 80%, greater than about 85%, greater than about 90%, greater than about 92%, greater than about 93%, greater than about 97% and greater than about 99%, of the single-walled carbon nanotubes in a population of single-walled carbon nanotubes can be semiconducting, or greater than about 50%, including greater than about 75%, greater than about 90%, greater than about 97%, and greater than about 99%, of the single-walled carbon nanotubes in a population of single-walled carbon nanotubes can be metallic). In some embodiments, the population can be substantially monodisperse in terms of their chiralities (e.g., greater than about 30%, including greater than about 50%, greater than about 75%, and greater than about 90%, of the single-walled carbon nanotubes in a population of single-walled carbon nanotubes can include the same chirality (n, m) type).

It should be understood that populations of carbon nanotubes of the present teachings are loose or bulk carbon nanotubes, which are different from carbon nanotubes that are grown on and adhered to a substrate for a particular end use thereon.

Also embraced within the scope of the present teachings are articles of manufacture that include a population of single-walled carbon nanotubes according to the present teachings, and those articles that include isolated or bare single-walled carbon nanotubes provided by the methods of the present teachings. Examples of such articles of manufacture include, but are not limited to, various electronic devices, optical devices, and optoelectronic devices. Examples of such devices include, but are not limited to, thin film transistors (e.g., field effect transistors), chemical sensors, near-infrared emitters, and near-infrared detectors. Other examples of articles of manufacture according to the present teachings include transparent conductive films, interconnects in integrated circuits, and conductive additives in composites.

BRIEF DESCRIPTION OF THE DRAWINGS

It should be understood that certain drawings are not necessarily to scale, with emphasis generally being placed upon illustrating the principles of the present teachings. The drawings are not intended to limit the scope of the present teachings in any way.

FIG. 4A is a schematic depicting typical, initial density gradient. FIG. 4B shows graphically the redistribution of a density profile.

FIGS. 5A and 5B, and FIG. 5C are photographic representations that illustrate how SWNTs can be concentrated via density gradient ultracentrifugation using a large step density gradient.

FIG. 7A is a photograph of the centrifugation tube after a one-step separation. FIG. 7B shows the optical absorbance spectra (1 cm path length) after separation using density gradient ultracentrifugation.

FIG. 8A is a photograph of the centrifugation tube after a one-step separation. FIG. 8B shows the optical absorbance spectra (1 cm path length) after separation using density gradient ultracentrifugation.

FIGS. 9A-9C show optical spectra of (a) deoxycholate encapsulated SWNTs (FIG. 9A), (b) taurodeoxycholate encapsulated SWNTs (FIG. 9B), and (c) SDS-encapsulated SWNTs separated in single surfactant density gradients (FIG. 9C).

FIG. 10A is a photograph of the centrifugation tube after a one-step separation. FIG. 10B shows the optical absorbance spectra (1 cm path length) after separation using density gradient ultracentrifugation.

FIG. 11A plots photoluminescence intensity as a function of excitation and emission wavelengths (vertical and horizontal axes, respectively). FIG. 11B plots photoluminescence intensity versus excitation wavelength at 740 nm. FIGS. 11C and 11D plot the partial derivatives of photoluminescence intensities as a function of excitation and emission wavelengths (vertical and horizontal axes, respectively), and versus excitation wavelength at 740 nm, respectively.

FIGS. 13A and 13B are the corresponding optical spectra to the photoluminescence spectra in FIG. 12.

FIG. 15A was obtained with a heterogeneous population of HiPCO-grown SWNTs before separation. FIGS. 15B and 15C were obtained with a heterogeneous population of HiPCO-grown SWNTs after separation using a co-surfactant system (1:4 ratio by weight, SDS:SC).

FIG. 16A is a photograph showing isolation of predominantly semiconducting laser-ablation-synthesized SWNTs using a co-surfactant system (1:4 SDS:SC). FIG. 16B shows the optical absorbance spectra (1 cm path length) after separation using density gradient ultracentrifugation.

FIG. 20 shows the optical absorption spectra of unsorted (as open star symbols), sorted metallic (as open triangles), and sorted semiconducting (as open diamond symbols) laser-ablation-synthesized SWNTs obtained with improved signal-to-noise ratio. The asterisk symbol at about 900 nm identifies optical absorption from spurious semiconducting SWNTs. The asterisk symbol at about 600 nm identifies optical absorption from spurious metallic SWNTs.

FIGS. 21A and 21B shows the baseline subtraction for measuring the amplitudes of absorption for sorted metallic SWNTs. FIG. 21A shows the measurement of absorption from metallic SWNTs. FIG. 21B shows the measurement of absorption from spurious semiconducting SWNTs.

FIG. 22A shows the measurement of absorption from metallic SWNTs. FIG. 22B shows the measurement of absorption from spurious semiconducting SWNTs.

FIG. 23A shows the measurement of absorption from metallic SWNTs. FIG. 23B shows the measurement of absorption from spurious semiconducting SWNTs.

FIGS. 25A-25D show electrical devices of semiconducting and metallic SWNTs. FIG. 25A is a periodic array of source and drain electrodes (single device highlighted). FIG. 25B shows a representative atomic force microscopy (AFM) image of thin film, percolating SWNT network. FIG. 25C shows a field-effect transistor (FET) geometry (s=source; g=gate; d=drain). The SWNT networks were formed on a 100 nm, thermally-grown $SiO_2$ layer, which served as the gate dielectric. FIG. 25D shows the inverse of sheet resistance as a function of gate bias for semiconducting (open triangles) and metallic (open circles) SWNTs purified in co-surfactant density gradients. The electronic mobility of the semiconducting SWNT networks was estimated by fitting the source-drain current versus the gate bias for a fixed source-drain bias in the "on" regime of the FETs to a straight line (inset).

DETAILED DESCRIPTION OF CERTAIN EMBODIMENTS

Figure 1:
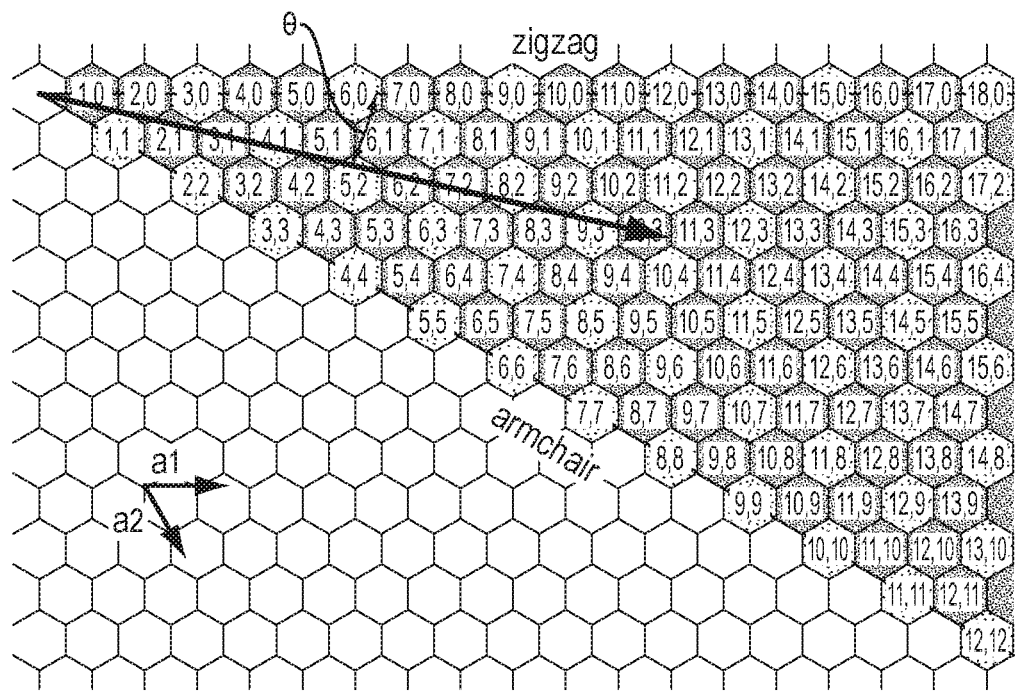
FIG. 1 illustrates different physical structures of carbon nanotubes.

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps. It should be understood that the order of steps or order for performing certain actions is immaterial so long as the method remains operable. Moreover, two or more steps or actions can be conducted simultaneously.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise.

It should be understood that reference herein to "carbon nanotubes" refers to single-walled carbon nanotubes (SWNTs) unless otherwise stated or inferred from the description. As used herein, the terms "carbon nanotubes," "single-walled carbon nanotubes," or "SWNTs" should be understood to include single-walled carbon nanotubes synthesized by any current or future techniques and having any physical properties (e.g., electronic type or chirality) or dimensions (e.g., individual diameter or length) achieved by such current or future techniques unless otherwise stated or inferred from the description. For example, depending on the synthetic method used to prepare the SWNTs, SWNTs can have individual lengths ranging from about 1-10$^7$ nm (about 10 Å to about 1 cm), and individual diameters ranging from about 0.5-10 nm (about 5-100 Å). To date, single-walled carbon nanotubes have been synthesized by processes including high pressure carbon monoxide decomposition ("HiPCO"), Co—Mo catalysis ("CoMoCAT"), laser ablation, arc discharge, and chemical vapor deposition, and the individual diameter of the SWNTs synthesized by one or more of these techniques can be up to about 10 Å (e.g., from about 5 Å to about 10 Å), up to about 20 Å (e.g., from about 5 Å to about 20 Å, from about 5 Å to about 16 Å, from about 5 Å to about 11 Å, from about 7 Å to about 20 Å, from about 7 Å to about 16 Å, from about 7 Å to about 11 Å, from about 11 Å to about 20 Å, or from about 11 Å to about 16 Å), and up to about 50 Å (e.g., from about 5 Å to about 50 Å, from about 7 Å to about 50 Å, from about 11 Å to about 50 Å, from about 16 Å to about 50 Å, or from about 20 Å to about 50 Å). Because the concepts and principles of the present teachings do not depend on the individual physical dimensions of the SWNTs to be separated, the present methods and systems can be applied to separate SWNTs regardless of their individual diameters, including SWNTs having individual diameters greater than those achieved by currently available synthesis methods.

In one aspect, the present teachings relate to methods for separating structurally and/or characteristically heterogeneous SWNTs. Methods of the present teachings can allow separation of SWNTs as a function of structure and/or one or more other properties without modifying the nanotubes chemically or structurally. Methods of the present teachings can achieve simultaneous selectivity of diameter and chirality, diameter and electronic type, electronic type and chirality, or diameter, electronic type, and chirality, and can be applied to separate SWNTs of a wide range of diameters. Furthermore, methods of the present teachings are broadly general and scalable, and can be used in conjunction with existing automation.

More specifically, the present teachings provide methods for separating carbon nanotubes by at least one selected property. The at least one selected property can be one or more of chirality, diameter, band gap, and electronic type (metallic versus semiconducting). Some of these properties can be independent of the other properties, while others can be interrelated. For example, the diameter and the electronic type of a particular carbon nanotube can be determined if its chiral indices are known, as shown in FIG. 1. The physical structure (chirality) of a carbon nanotube is specified by two integers (n, m), the chiral indices, such that C=na1+ma2 where is C is the roll-up vector that defines the circumference of a nanotube, and a1 and a2 are the primary lattice vectors that define a graphene sheet. In FIG. 1, metallic SWNTs are labeled green, and mod(n, m)=1 and mod(n, m)=2 semiconducting SWNTs are labeled red and blue, respectively. The methods can include contacting the carbon nanotubes with an agent that interacts differentially with carbon nanotubes that vary by the at least one selected property. In some embodiments, the agent can affect differentially the density of carbon nanotubes as a function of the at least one selected property.

Accordingly, methods of the present teachings can be directed to using a density gradient to separate carbon nanotubes, e.g., by means of density gradient centrifugation.

Methods of the present teachings can include creating or enhancing a density (mass per volume) difference among carbon nanotubes, e.g., SWNTs, of varying structures and/or properties (e.g., chirality, diameter, band gap, and/or electronic type). The density difference can be a buoyant density difference. The buoyant density of a SWNT in a fluid medium can depend on multiple factors, including the mass and volume of the carbon nanotube itself, its surface functionalization, and electrostatically bound hydration layers. For example, surface functionalization of the carbon nanotubes can be non-covalent, and can be achieved by encapsulating the carbon nanotubes with one or more surface active components (e.g., surfactants). Accordingly, in some embodiments, methods of the present teachings can include contacting single-walled carbon nanotubes of varying structures and/or properties with at least one surface active component (e.g., surfactant), to provide a differential buoyant density among the single-walled carbon nanotubes when the complexes formed by the surface active component(s) and the single-walled carbon nanotubes are placed in a fluid medium that includes a density gradient. The differential buoyant density can be a function of nanotube diameter, band gap, electronic type and/or chirality, thereby allowing separation of the single-walled carbon nanotubes by diameter, band gap, electronic type and/or chirality.

Figure 2:
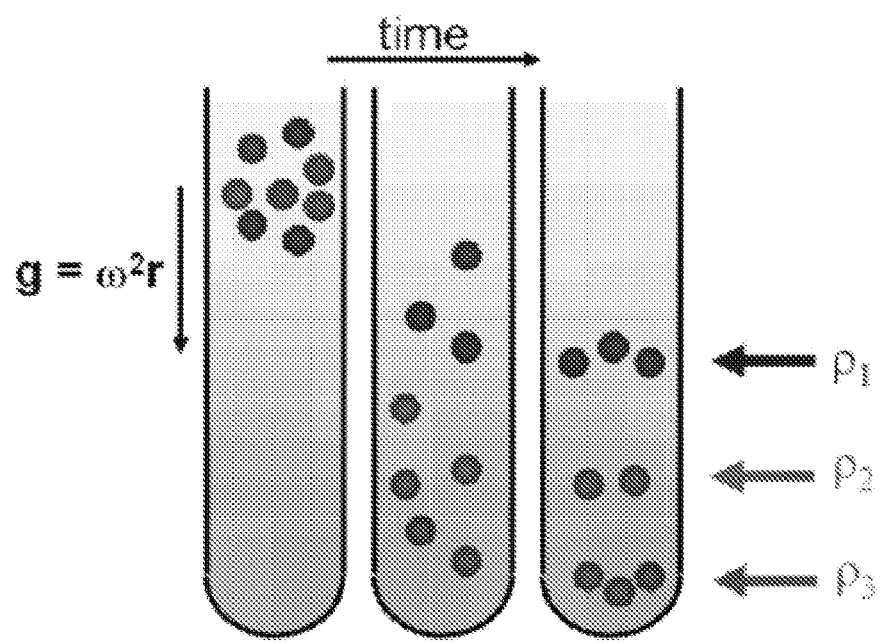
FIG. 2 is a schematic of density gradient centrifugation.

Generally, density gradient centrifugation uses a fluid medium with a predefined variation in its density as a function of position within a centrifuge tube or compartment (i.e. a density gradient). A schematic of the density gradient centrifugation process is depicted in FIG. 2. Species of different densities sediment through a density gradient until they reach their respective isopycnic points, i.e., the points in a gradient at which sedimentation stops due to a matching of the buoyant density of the species with the buoyant density of the fluid medium.

Fluid media useful with the present teachings are limited only by carbon nanotube aggregation therein to an extent precluding at least partial separation. Accordingly, without limitation, aqueous and non-aqueous fluids can be used in conjunction with any substance soluble or dispersible therein, over a range of concentrations so as to provide the medium a density gradient for use in the separation techniques described herein. Such substances can be ionic or non-ionic, non-limiting examples of which include inorganic salts and alcohols, respectively. In certain embodiments, as illustrated more fully below, such a medium can include a range of aqueous iodixanol concentrations and the corresponding gradient of concentration densities. Likewise, as illustrated below, the methods of the present teachings can be influenced by gradient slope, as affected by the length of the centrifuge tube or compartment and/or the angle of centrifugation.

As understood by those in the art, aqueous iodixanol is a common, widely used non-ionic density gradient medium. However, other media can be used with good effect, as would also be understood by those individuals. More generally, any material or compound stable, soluble or dispersible in a fluid or solvent of choice can be used as a density gradient medium. A range of densities can be formed by dissolving such a material or compound in the fluid at different concentrations, and a density gradient can be formed, for instance, in a centrifuge tube or compartment. More practically, with regard to choice of medium, the carbon nanotubes, whether or not functionalized, should also be soluble, stable or dispersible within the fluids/solvent or resulting density gradient. Likewise, from a practical perspective, the maximum density of the gradient medium, as determined by the solubility limit of such a material or compound in the solvent or fluid of choice, should be at least as large as the buoyant density of the particular carbon nanotubes (and/or in composition with one or more surface active components, e.g., surfactants) for a particular medium.

Accordingly, with respect to the present teachings, any aqueous or non-aqueous density gradient medium can be used providing the single-walled carbon nanotubes are stable; that is, do not aggregate to an extent precluding useful separation. Alternatives to iodixanol include but are not limited to inorganic salts (such as CsCl, $Cs_2SO_4$, KBr, etc.), polyhydric alcohols (such as sucrose, glycerol, sorbitol, etc.), polysaccharides (such as polysucrose, dextrans, etc.), other iodinated compounds in addition to iodixanol (such as diatrizoate, nycodenz, etc.), and colloidal materials (such as but not limited to percoll). Other media useful in conjunction with the present teachings would be understood by those skilled in the art made aware of the present teachings and/or by way of co-pending U.S. patent application Ser. No. 11/368,581, filed on Mar. 6, 2006, the entirety of which is incorporated herein by reference.

Other parameters which can be considered upon choice of a suitable density gradient medium include, without limitation, the diffusion coefficient and the sedimentation coefficient, both of which can determine how quickly a gradient redistributes during centrifugation. Generally, for more shallow gradients, a larger diffusion coefficient and a smaller sedimentation coefficient are desired. For instance, Percoll® is a non-ionic density gradient medium having a relatively small water affinity compared to other media. However, it has a large sedimentation rate and a small diffusion coefficient, resulting in quick redistribution and steep gradients. While cost can be another consideration, the methods of the present teachings tend to mitigate such concerns in that the media can be repeatedly recycled and reused. For instance, while aqueous iodixanol is relatively expensive as compared to other density gradient media, it can be recycled, with the iodixanol efficiently recovered at high yield, for reuse in one separation system after another.

Regardless of medium identity or density gradient, a heterogeneous sample of carbon nanotubes (e.g., a mixture of carbon nanotubes of varying structures and/or properties) can be introduced into the fluid medium on or at any point within the gradient before centrifugation. In certain embodiments, the heterogeneous sample of carbon nanotubes (or a composition including the heterogeneous sample of carbon nanotubes and at least one surface active component) can be introduced at a spatial point along the gradient where the density remains roughly constant over time even as the density gradient becomes steeper over the course of centrifugation. Such an invariant point can be advantageously determined to have a density corresponding to about the buoyant density of the nanotube composition(s) introduced thereto.

Prior to introduction into the density gradient medium, the heterogeneous sample of carbon nanotubes can be provided in composition with one or more surface active components. Generally, such components can function, in conjunction with the fluid medium, to reduce nanotube aggregation. In some embodiments, the one or more surface active components can include one or more surfactants selected from a wide range of non-ionic or ionic (cationic, anionic, or zwitterionic) amphiphiles. In certain embodiments, the surface active component can include an anionic surfactant. In some embodiments, a surface active component can include one or more sulfates, sulfonates, carboxylates, and combinations thereof. In some embodiments, a surface active component can include one or more bile salts (including but not limited to cholates, deoxycholates, taurodeoxycholates and combinations thereof), or other amphiphiles with anionic head groups and flexible alkyl tails (referred interchangeably herein below as anionic alkyl amphiphiles; such as but not limited to dodecyl sulfates and dodecylbenzene sulfonates). Examples of such bile salts can include but are not limited to sodium cholate (SC), sodium deoxycholate, and sodium taurodeoxycholate. Examples of amphiphiles with anionic head groups and flexible alkyl tails can include, but are not limited to, sodium dodecyl sulfate (SDS) and sodium dodecylbenzene sulfonate (SDBS). More generally, such bile salts can be more broadly described as a group of molecularly rigid and planar amphiphiles with a charged face opposing a hydrophobic face. As such, these bile salts (or other surface active components having characteristics similar to these bile salts) are capable of providing a planar and/or rigid structural configuration about and upon interaction with carbon nanotubes, which can induce differential nanotube buoyant density. In other embodiments, the surface active component can include a cationic surfactant. For example, such a component can be selected from amphiphiles with cationic head groups (e.g., quaternary ammonium salts) and flexible or rigid tails.

Without wishing to be bound to any particular theory, a study on graphene, which is the closest analog to a SWNT, has reported that while anionic-alkyl surfactants organize into hemicylindrical micelles with liquid-like hydrophobic cores (E M. F. Islam, E. Rojas, D. M. Bergey, A. T. Johnson, A. G. Yodh, *Nano Lett.* 3, 269 (2003); E. J. Wanless, W. A. Ducker, *J. Phys. Chem.* 100, 3207 (1996)), bile salts form well-structured monolayers with their less polar sides facing the hydrophobic surface (Y. Sasaki et al., *Colloids Surf., B* 5, 241 (1995)). It also has been reported that bile salts order to form well defined guest-host structures around small hydrophobic molecules (S. Mukhopadhyay and U. Maitra, *Curr. Sci.* 87, 1666 (2004); J. Tamminen, E. Kolehmainen, *Molecules* 6, 21 (2001)). Accordingly, the rigidity and planarity of bile salts, in contrast with anionic-alkyl surfactants, can be expected to result in encapsulation layers that are sensitive to subtle changes in the underlying SWNT. Other effects, such as charge-transfer between metallic SWNTs and the surfactants also could be important.

Figures 3A, 3B, 3C:
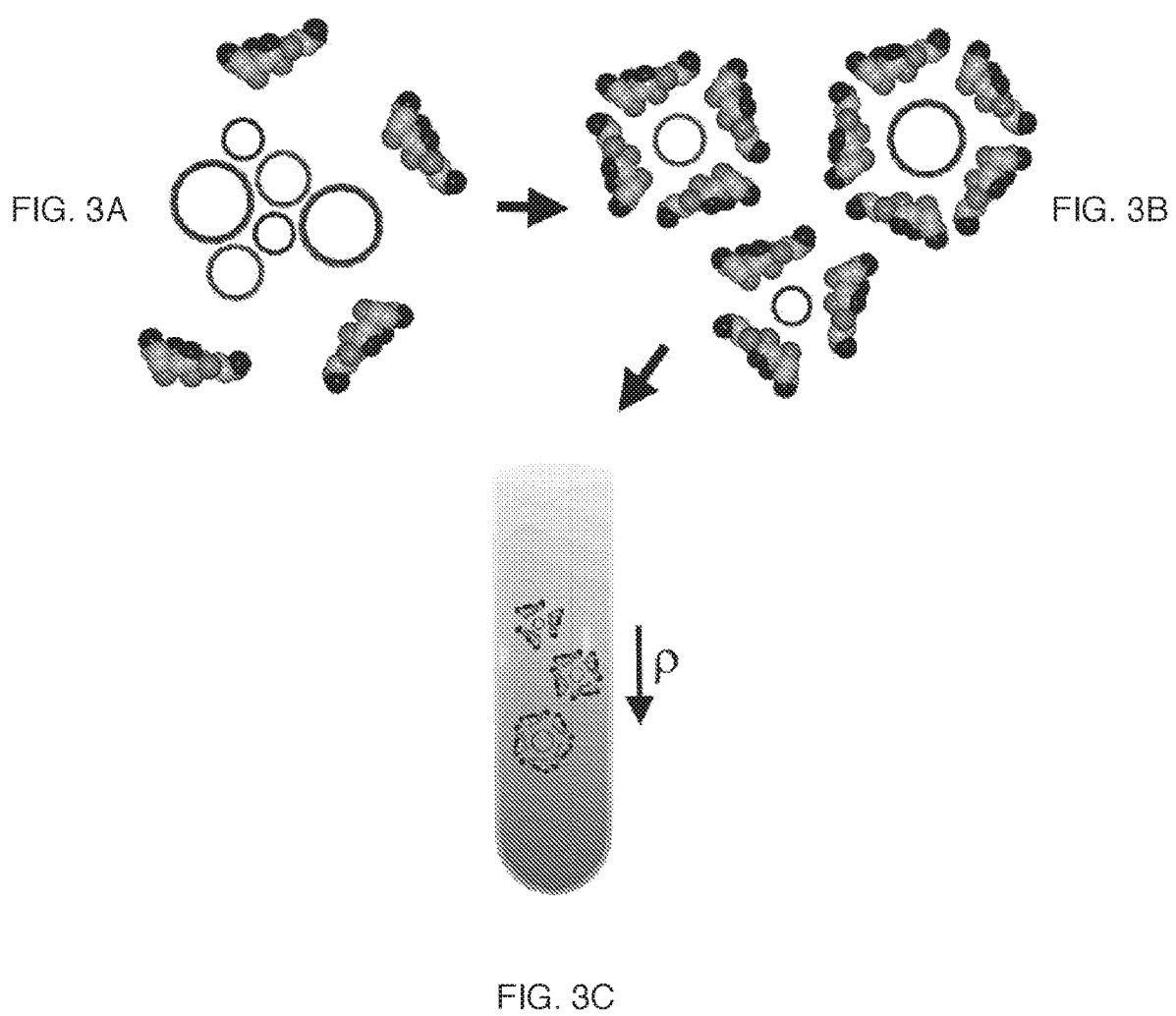
FIGS. 3A-3C are schematic diagrams illustrating surfactant encapsulation and sorting via density.

Density gradient centrifugation can be used with comparable effect for the separation of a wide range of surfactant-encapsulated SWNTs. Without limitation to any one theory or mode of operation, surfactant-based separation via density gradient centrifugation is believed to be largely driven by how surfactants organize around SWNTs of different structures and electronic types. FIGS. 3A-3C, for example, illustrate how a single type of surfactant encapsulates carbon nanotubes of different structures (in this case, diameters) differentially. As such encapsulation contributes to a density difference proportional to the diameter of the carbon nanotubes, separation of such surfactant encapsulated SWNTs is possible via density gradient ultracentrifugation. The energetic balance among nanotube-, water- and surfactant-surfactant interactions as well as their packing density, orientation, ionization, and the resulting hydration of these surfactants can all be critical parameters affecting buoyant density and the quality of separation and purification.

While density gradient centrifugation has been employed to separate DNA-wrapped SWNTs by diameter and band gap, DNA functionalization has not been optimized for all embodiments. For instance, due to limited stability in aqueous density gradients, DNA-wrapped SWNTs may not be amenable to the refinements in purification gained from repeated centrifugation in density gradients. In addition, the complete removal of the DNA wrapping after enrichment can be problematic. Furthermore, the availability and cost of specific, custom oligomers of single-stranded DNA can be prohibitive. Sensitivity to electronic type (metallic versus semiconducting) also has yet to be fully explored.

Accordingly, the methods of the present teachings can be directed to use of a surface active component that does not include DNA or DNA fragments. For example, in embodiments where the surface active component includes a single surfactant, an anionic amphiphile such as an anionic-alkyl surfactant or any of the bile salts described above can be used. In particular, many surfactants contemplated for use with the present teachings cost orders of magnitude less than single-stranded DNA. The difference is significant when comparing, for instance, sodium cholate (98% purity) from Sigma-Aldrich (St. Louis, Mo.) on a 100 g scale, quoted at $0.62/g, with single-stranded DNA of sequence $d(GT)_{20}$ produced on the largest scale offered (150 mg scale, much less than 98% purity) by Alpha-DNA (Montreal, Canada) at $2242.80/g. Furthermore, the adsorption of the surface active components disclosed herein to SWNTs is reversible and compatible with a wide range of tube diameters (e.g., SWNTs having a diameter in the range of about 7 Å to about 16 Å. More importantly, by using such a surface active component, the structure-density relationship for SWNTs can be easily controlled by varying the surfactant(s) included in the surface active component.

As demonstrated herein, successful separation by the present method(s) has been achieved using surfactants such as salts of bile acids, e.g. cholic acid, including sodium cholate, sodium deoxycholate, and sodium taurodeoxycholate. Separation in density gradients also can be achieved using other surface active components, such as surfactants, consistent with the principles and concepts discussed herein and the knowledge of those skilled in the art. For the case of single surfactant separations, distinct structure-density relationships were observed for anionic-alkyl surfactants and bile salts as described in examples herein below. Use of a single surfactant can be especially useful for separation by diameter. Without wishing to be bound by any particular theory, it is believed that the use of single surface active component results in a substantially uniform thickness of the surface active component around the differently dimensioned SWNTs in a mixture and accordingly, a substantially uniform density for SWNTs of a specific diameter.

In some embodiments, the heterogeneous sample of carbon nanotubes can be provided in composition with at least two surface active components, where the at least two surface active components can be of the same type or of different types. In some embodiments, the at least two surface active components can competitively adsorb to the SWNT surface. For example, the at least two surface active components can be two different surfactants. Such a competitive co-surfactant system can be used to achieve optimal separation between metallic and semiconducting single-walled carbon nanotubes. For example, the at least two surface active components can include two bile salts, or alternatively, a bile salt with a surfactant. In certain embodiments, the use of sodium cholate with sodium dodecyl sulfate in a ratio between about 4:1 and about 1:4 by weight, and particularly, 7:3 by weight, was observed to afford good selective separation of SWNTs by electronic type. The metal-semiconductor selectivity observed using the present methods indicates a certain degree of coupling of the surfactant(s) and/or their hydration with the electronic nature of the underlying SWNTs. Additionally, the packing density of the surfactants and their hydration likely may be sensitive to electrostatic screening by the underlying SWNTs.

Upon sufficient centrifugation (i.e., for a selected period of time and/or at a selected rotational rate at least partially sufficient to separate the carbon nanotubes along the medium gradient), at least one separation fraction including separated single-walled carbon nanotubes can be separated from the medium. Such fraction(s) can be isopycnic at a position along the gradient. An isolated fraction can include substantially monodisperse single-walled carbon nanotubes, for example, in terms of at least one characteristic selected from nanotube diameter dimensions, chiralities, and electronic type. Various fractionation techniques can be used, including but not limited to, upward displacement, aspiration (from meniscus or dense end first), tube puncture, tube slicing, cross-linking of gradient and subsequent extraction, piston fractionation, and any other fractionation techniques known in the art.

The medium fraction and/or nanotube fraction collected after one separation can be sufficiently selective in terms of separating the carbon nanotubes by the at least one selected property (e.g. diameter). However, in some embodiments, it can be desirable to further purify the fraction to improve its selectivity. Accordingly, in some embodiments, methods of the present teachings can include iterative separations. Specifically, an isolated fraction can be provided in composition with the same surface active component system or a different surface active component system, and the composition can be contacted with the same fluid medium or a different fluid medium, where the fluid medium can have a density gradient that is the same or different from the fluid medium from which the isolated fraction was obtained. In certain embodiments, fluid medium conditions or parameters can be maintained from one separation to another. In certain other embodiments, at least one iterative separation can include a change of one or more parameters, such as but not limited to, the identity of the surface active component(s), medium identity, medium density gradient and/or medium pH with respect to one or more of the preceding separations. Accordingly, in some embodiments of the methods disclosed herein, the choice of the surface active component can be associated with its ability to enable iterative separations, which, for example, is considered not possible for DNA wrapped SWNTs (due to, in part, the difficulties in removing the DNA from the SWNTs).

In certain embodiments, such as separations by chirality or electronic type, the present methods can include multiple iterations of density gradient centrifugation, whereby the degree of separation by physical and electronic structure can improve with each iteration. For instance, removal of undesired chiralities can be effected by successively repetitive density gradient centrifugation. Additionally, the surfactant(s) encapsulating the SWNTs can be modified or changed between iterations, allowing for even further refinement of separation, as the relationship between density and the physical and electronic structure will vary as a function of any resulting surfactant/encapsulation layer. Separation fractions isolated after each separation can be washed before further complexation and centrifugation steps are performed.

The selectivity of the fraction(s) collected can be confirmed by various analytical methods. For example, optical techniques including but not limited to spectroscopic techniques such as spectrophotometric analysis and fluorimetric analysis can be used. Such techniques generally include comparing one or more absorbance and/or emission spectra with a corresponding reference spectrum. The isolated nanotube fraction generally has a narrower distribution in the variance of the at least one selected property.

As described above, carbon nanotubes synthesized by currently known techniques including, without limitation, high pressure carbon monoxide ("HiPCO") process, Co—Mo catalysis ("CoMoCAT") process, and laser ablation process, typically have heterogeneous structures and properties. For example, both the CoMoCAT and the HiPCO methods typically yield SWNTs having a diameter in the range of about 7 Å to about 11 Å, while the laser-ablation growth method typically yields SWNTs having a diameter in the range of about 11 Å to about 16 Å. Accordingly, before separation by the methods disclosed herein, the heterogeneous sample of carbon nanotubes can have varying chiralities, diameter, and/or electronic type. In some embodiments, the diameter dimensions of the carbon nanotubes can range from about 7 Å to about 20 Å, from about 7 Å to about 16 Å, from about 7 Å to about 15 Å, from about 7 Å to about 12 Å, from about 7 Å to about 11 Å, from about 7 Å to about 10 Å, from about 11 Å to about 20 Å, from about 11 Å to about 16 Å, from about 11 Å to about 15 Å, from about 12 Å to about 20 Å, from about 12 Å to about 16 Å, or from about 12 Å to about 15 Å. In some embodiments, the heterogeneous sample of carbon nanotubes can include metallic carbon nanotubes and semiconducting carbon nanotubes.

As demonstrated by the examples herein below, selectivity made possible by the present teachings can be indicated by separation of carbon nanotubes differing by diameters less than about 0.6 Å. For example, in some embodiments, the present teachings can provide a population of carbon nanotubes (e.g., SWNTs) in which >99.9%, >99%, >97%, >95%, >90%, >85%, >80%, >75%, or >50% of the carbon nanotubes can have a diameter differing by less than about 0.6 Å or that >99.9%, >99%, >97%, >95%, >90%, >85%, >80%, >75%, or >50% of the carbon nanotubes can have a diameter within about 0.6 Å of the mean diameter of the population. In some embodiments, the present teachings can provide a population of carbon nanotubes in which >99.9%, >99%, >97%, >95%, >90%, >85%, >80%, >75%, or >50% of the carbon nanotubes can have a diameter differing by about 0.5 Å or that >99.9%, >99%, >97%, >95%, >90%, >85%, >80%, >75%, or >50% of the carbon nanotubes can have a diameter within about 0.5 Å of the mean diameter of the population. In some embodiments, the present teachings can provide a population of carbon nanotubes in which >99.9%, >99%, >97%, >95%, >90%, >85%, >80%, >75%, or >50% of the carbon nanotubes can have a diameter differing by about 0.2 Å or that >99.9%, >99%, >97%, >95%, >90%, >85%, >80%, >75%, or >50% of the carbon nanotubes can have a diameter within about 0.2 Å of the mean diameter of the population. In some embodiments, the present teachings can provide a population of carbon nanotubes in which >99.9%, >99%, >97%, >95%, >90%, >85%, >80%, >75%, or >50% of the carbon nanotubes can have a diameter differing by about 0.1 Å or that >99.9%, >99%, >97%, >95%, >90%, >85%, >80%, >75%, or >50% of the carbon nanotubes can have a diameter within about 0.1 Å of the mean diameter of the population. In certain embodiments, the present teachings can provide a population of carbon nanotubes in which >75% of the carbon nanotubes can have a diameter within about 0.5 Å of the mean diameter of the population.

Selectivity made possible by the present teachings can also be indicated by separation of carbon nanotubes where >33% of such separated carbon nanotubes are metallic or >67% of such separated carbon nanotubes are semiconducting. For example, in some embodiments, the present teachings can provide a population of carbon nanotubes (e.g., SWNTs) in which >99.9%, >99%, >97%, >95%, >92%, >90%, >85%, >80%, >75%, >50%, or >33% of the carbon nanotubes can be metallic. In other embodiments, the present teachings can provide a population of carbon nanotubes in which >99.9%, >99%, >97%, >95%, >92%, >90%, >85%, >80%, >75%, or >67% of the carbon nanotubes can be semiconducting. In certain embodiments, the present teachings can provide a population of carbon nanotubes in which >50% of the carbon nanotubes can be metallic. In certain embodiments, the present teachings can provide a population of carbon nanotubes in which >70% of the carbon nanotubes can be semiconducting.

Similarly, selectivity made possible by the present teachings can be indicated by separation of carbon nanotubes where >15% of such separated carbon nanotubes are of the same chirality (n,m) type. For example, in some embodiments, the present teachings can provide a population of carbon nanotubes (e.g., SWNTs) in which >99.9%, >99%, >97%, >95%, >90%, >85%, >80%, >75%, >50%, >30%, or >15% of the carbon nanotubes can be of the same chirality (n,m) type. In certain embodiments, the present teachings can provide a population of carbon nanotubes in which >30% of the carbon nanotubes can include the same chirality (n,m) type.

As described herein, density gradient ultracentrifugation can provide a scalable approach for the bulk purification of carbon nanotubes by diameter, band gap, and electronic type. As demonstrated in the examples below, the present teachings can purify heterogeneous mixtures of SWNTs and provide sharp diameter distributions in which greater than 97% of semiconducting SWNTs are within 0.2 Å of the mean diameter. Furthermore, the structure-density relationship for SWNTs can be engineered to achieve exceptional metal-semiconductor separation, for example, by using mixtures of competing co-surfactants, thus enabling the isolation of bulk quantities of SWNTs that are predominantly a single electronic type.

Because SWNTs purified by methods of the present teachings are highly compatible with subsequent processing techniques and can be integrated into devices, the present teachings also provide articles of manufacture (including electronic devices, optical devices, and combinations thereof) and other technological applications that require SWNTs with monodisperse structure and properties.

EXAMPLES OF THE INVENTION

The following non-limiting examples and data illustrate various aspects and features relating to the methods and/or systems of the present teachings, including the preparation and use of density gradient media for carbon nanotube separation, confirmation of which is available using spectroscopic techniques of the sort described herein and known to those skilled in the art. In comparison with the prior art, the present methods and systems provide results and data which are surprising, unexpected and contrary thereto. While the utility of the present teachings is illustrated through the use of several methods and the density gradient media and surface active components which can be used therewith, it will be understood by those skilled in the art that comparable results are obtainable with various other media and surface active components, as are commensurate with the scope of the present teachings. Other non-limiting examples are provided upon consideration of the examples, figures and corresponding discussion in the aforementioned, incorporated application.

Example 1: Separation of SWNTs Using Different Single-Surfactant Systems Raw SWNT Material SWNTs of various diameters were explored by utilizing SWNTs produced by the CoMoCAT method (which yields tubes about 7-11 Å in diameter), and the laser-ablation growth method (which yields tubes about 11-16 Å in diameter). CoMoCAT material was purchased from Southwest Nanotechnologies, Inc. (Norman, Okla.) as raw material purified only to remove silica. The laser-ablation grown SWNTs were manufactured by Carbon Nanotechnologies Inc. (Houston, Tex.) and received in their raw form.

Surfactant Encapsulation

To disperse SWNTs in solutions of bile salts or other surfactants, 1 mg/mL SWNTs were dispersed in solutions of 2% w/v surfactant via ultrasonication. Sodium dodecyl sulfate, electrophoresis grade, minimum 99%, was purchased from Fisher Scientific. Dodecylbenzene sulfonic acid, sodium salt, an 80% (CH) mixture of homologous alkyl benzenesulfonates; sodium cholate hydrate, minimum 99%; deoxycholic acid, minimum 99%; and sodium taurodeoxycholate hydrate, minimum 97% TLC, were purchased from Sigma-Aldrich, Inc. The sodium salt of deoxycholic acid was used in experiments and was formed by addition of equal molar concentrations of NaOH. Ultrasonication (Sonic Dismembrator 500, Fisher Scientific) was implemented by immersing an ultrasonic probe (microtip extension, Fisher Scientific) into 3-15 mL of the SWNT solution. The probe was driven at 40% of the instrument's maximum amplitude for 60 minutes at 20 kHz. During sonication, the solution was immersed in a bath of ice-water to prevent heating. In some instances, after ultrasonication, large aggregations of insoluble material were removed via ultracentrifugation at 54 krpm for 14 minutes in a TLA100.3 rotor (Beckman-Coulter).

Methods for Creating Density Gradients

Density gradients were formed from aqueous solutions of a non-ionic density gradient medium, iodixanol, purchased as OptiPrep® 60% w/v iodixanol, 1.32 g cm$^{-3}$, (Sigma-Aldrich Inc.). Gradients were created directly in centrifuge tubes by one of two methods, by layering and subsequent diffusion or by using a linear gradient maker. See J. M. Graham, *Biological centrifugation*, (BIOS Scientific Publishers, Limited, ebrary, Inc., 2001). In the layering and subsequent diffusion method, 3-6 layers, each consisting of discrete, decreasing iodixanol concentrations, were layered in a centrifuge tube. Initially, this resulted in a density gradient that increased step-wise in density from the top to the bottom of a centrifuge tube. The centrifuge tube was then capped and the gradient was allowed to diffuse for 1-18 hours, depending on the length of the centrifuge tube and its angle of tilt during the diffusion step, until it was approximately linear. In an alternative method for creating density gradients, a linear gradient maker was utilized (SG 15 linear gradient maker, Hoefer Inc.) to directly create linear gradients in centrifuge tubes without having to wait for diffusion.

In some instances, an under-layer of 60% weight per volume iodixanol was inserted at the bottom of the gradient to raise the linear portion of the gradient in the centrifuge tube. Also, in some instances, centrifuge tubes were filled with an over-layer consisting of only surfactant (0% w/v iodixanol). All the layers initially consisted of the same concentration of surfactant, which was typically 2% w/v.

For the inclusion of SWNTs in linear gradients, several methods were utilized: (i) SWNTs, dispersed in aqueous solutions of surfactants (typically 2% w/v), were layered on top of the gradient before centrifugation; (ii) iodixanol was added to an aqueous solution of dispersed SWNTs to adjust its density and this solution was then inserted into a linear gradient via a syringe at the point in which the density of the preformed gradient matched that of the solution; and (iii) iodixanol was added to an aqueous solution of dispersed SWNTs and this solution was used as a layer of a step gradient. Due to the slower diffusion rate of the SWNTs compared with that of iodixanol, the SWNTs were observed to remain in their initial position during the diffusion step.

Centrifugation

Centrifugation was carried out in two different rotors, a fixed angle TLA100.3 rotor and a swing bucket SW41 rotor (Beckman-Coulter), at 22 degrees Celsius and at 64 krpm and 41 krpm, respectively, for 9-24 hours, depending on the spatial extent and initial slope of a gradient.

Typical Slopes and Densities of Initial Gradients (Before Centrifugation)

Figure 4A:
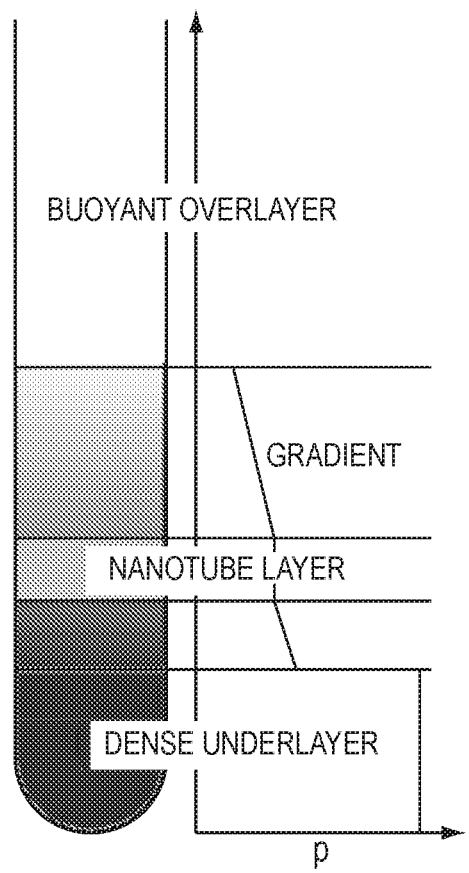
FIGS. 4A and 4B illustrate the layering of a density gradient and its redistribution during ultracentrifugation.
Figure 4B:
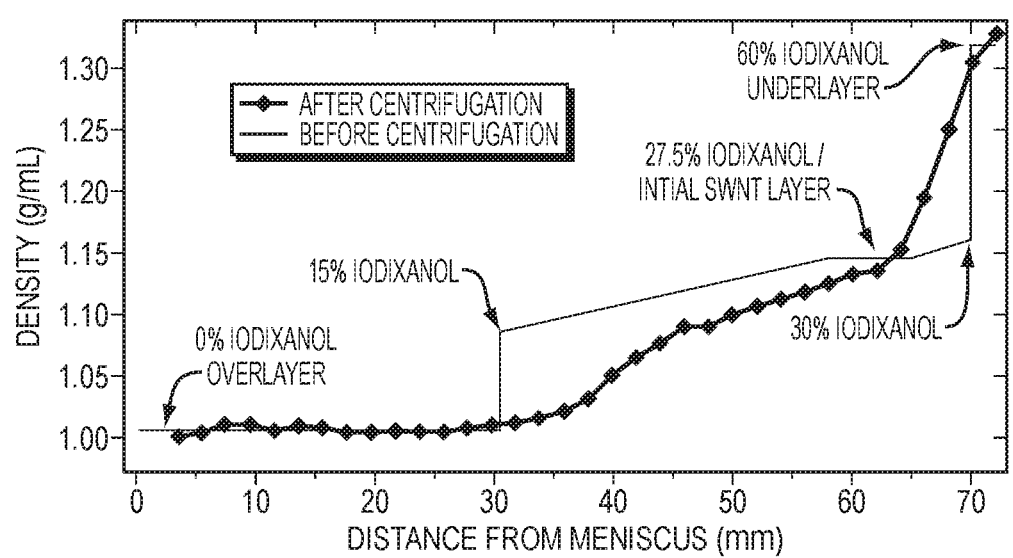

FIGS. 4A and 4B illustrate layering of a density gradient and its redistribution during ultracentrifugation. FIG. 4A is a schematic depicting a typical, initial density gradient. In between a dense underlayer and buoyant overlayer, a linear gradient of iodixanol is created and SWNTs are inserted into that layer before centrifugation. FIG. 4B shows graphically the redistribution of a density profile. During ultracentrifugation, the density gradient media (e.g., iodixanol) undergoes diffusion while simultaneously sedimenting towards the bottom of the centrifuge tube in response to the centripetal force, as governed by the Lamm equation.

In TLA100.3 centrifuge tubes (inner diameter 1.1 cm, capacity 3 mL), typical gradients varied from 5% w/v iodixanol at the top to 40% w/v iodixanol at the bottom (1.03 to 1.21 g cm$^{-3}$). Surfactant encapsulated SWNTs were initially seeded anywhere in the top ⅔ of the gradient. Typical centrifugation conditions were 9 hours at 64 krpm.

In SW41 centrifuge tubes (inner diameter 1.3 cm, capacity ~12 mL), typical gradients were constrained to less than the full height of the centrifuge tubes (FIG. 4). First, 1.5 mL of 60% w/v iodixanol (1.32 g cm$^{-3}$) was added to the bottom of the centrifuge tube. This layer was used to raise the height of the gradient in the centrifuge tube. On top of that underlayer, 5 mL of linear gradient was added. Then, 0.88 mL of SWNT solution (density already adjusted by addition of iodixanol) was inserted into that gradient. On top of the gradient, surfactant solution (no iodixanol) was added to completely fill the centrifuge tube to prevent its collapse at large centripetal forces (FIG. 4). For sodium cholate separations, the gradient-portion of the centrifuge tube linearly varied from 7.5% w/v (1.04 g cm$^{-3}$) at the top to 22.5% w/v (1.12 g cm$^{-3}$) at the bottom or from 10% w/v (1.05 g cm$^{-3}$) at the top to 25% w/v (1.13 g cm$^{-3}$) at the bottom. Typical centrifugation conditions were 12 hours at 41 krpm.

The chosen density and slope of a gradient are parameters that can be varied to optimize the effectiveness of density gradient ultracentrifugation. It is preferred that a density gradient be constructed to minimize the distance that the SWNTs must sediment before reaching their isopycnic point. Furthermore, it should be understood that during ultracentrifugation, the density profile (density as a function of height in the centrifuge tube) will redistribute as the density gradient medium responds to the centripetal force. Typically, this means that the density gradient will become steeper with time.

To aid in the formation of optimal density gradients, the re-distribution iodixanol and the separation of SWNTs during ultracentrifugation can be roughly predicted via numerical solutions to the Lamm equation if the buoyant densities of the SWNTs and their sedimentation coefficients are known. See J. M. Graham, *Biological centrifugation*, (BIOS Scientific Publishers, Limited, ebrary, Inc., 2001).

Concentration of SWNTs in Step Gradients

In some instances, after dispersion and isolation of SWNTs but before separation in density gradients, SWNT solutions were concentrated by ultracentrifugation in a step density gradient. FIGS. 5A and 5B, and FIG. 5C are photographical representations showing the concentration of SWNTs via density gradient ultracentrifugation using a large step density gradient. The photograph on the left hand side (FIGS. 5A and 5B) shows the distribution of the SWNT solution layer (a), which includes sodium cholate, the encapsulating agent, and no iodixanol (FIG. 5A), and the stop layer (b) (FIG. 5B), which includes 60% w/v iodixanol with the encapsulating agent added at the same concentration as layer (a), before concentration. The photograph on the right hand side (FIG. 5C) shows the concentrated SWNT solution after ultracentrifugation at ~200,000 g. The sodium cholate-encapsulated SWNTs, which have a buoyant density between $\rho_a$ and $\rho_b$, have sedimented to the interface between layer (a) and layer (b).

To form a step gradient and subsequently concentrate a SWNT solution, the SWNT solution (ρ~1 g/mL) was layered directly on top of an OptiPrep® solution (60% w/v iodixanol solution, 1.32 g/mL). Surfactant was added to the OptiPrep® solution at the same weight per volume as in the SWNT solution (usually 2% w/v surfactant). During ultracentrifugation, the isolated SWNTs, with a buoyant density between 1.00 and 1.32 g/mL, sedimented to the interface between both layers. The SWNTs at the interface were then withdrawn from the centrifuge tube via fractionation. This enabled the concentration of SWNTs by a factor of 3-5, as determined from optical spectrophotometry. The concentrated SWNTs can be removed via fractionation.

Fractionation

After centrifugation, the separated SWNTs were removed from their density gradients, layer by layer, by fractionation. To fractionate TLA100.3 tubes, a modified Beckman Fractionation System (Beckman-Coulter Inc.) was utilized in an upward displacement mode using Fluorinert® FC-40 (Sigma-Aldrich, Inc.) as a dense chase media. 25 µL fractions were collected. To fractionate SW41 centrifuge tubes, a Piston Gradient Fractionator system was utilized (Biocomp Instruments, Inc., Canada). 0.5-3.0 mm fractions were collected (70-420 µL in volume). In both cases, fractions were diluted to 1 mL in 2% w/v surfactant solution for optical characterization.

Measurement of Density Profile

To measure the density profile of a redistributed gradient after centrifugation, 100-300 µL fractions were collected and their densities were determined by measuring the mass of a known volume of those fractions using a calibrated micropipette and electronic balance. With increasing centrifugation time, the iodixanol redistributed towards the bottom of the centrifuge tube, resulting in steeper gradients, as governed by the Lamm equation (FIG. 4B).

Measurement of Optical Absorbance Spectra

The optical absorbance spectra of collected fractions of separated SWNTs were measured using a Cary 500 spectrophotometer (Varian, Inc.) from 400 to 1340 nm at 1 nm resolution for 0.066-0.266 s integration time. Samples of similar optical index of refraction (similar iodixanol and surfactant concentrations) were used as reference samples for subtraction of background absorbance (due to water, surfactant, iodixanol, etc.), using the two-beam mode of the Cary 500 (lamp illumination split between the sample of interest and the reference sample, with reference absorption subtracted from that of the sample). A baseline correction was utilized to correct for varying instrument sensitivities with wavelength.

Figure 6:
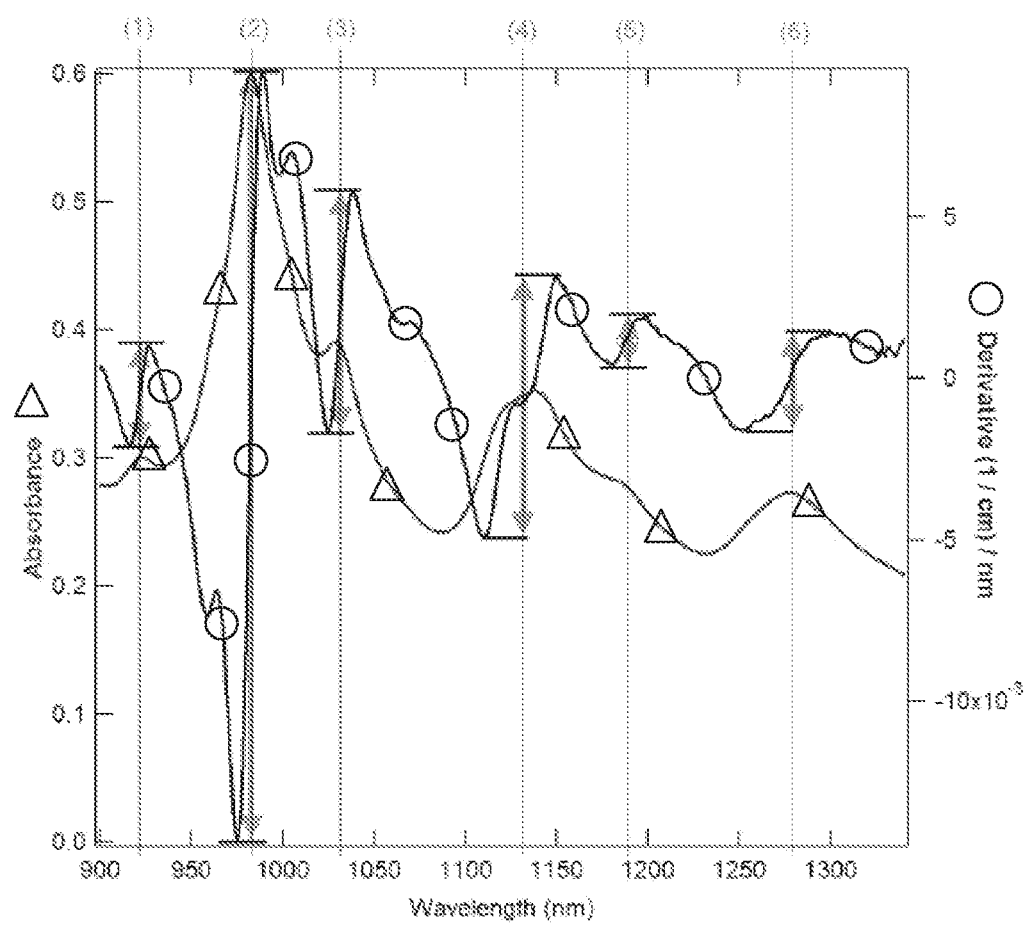
FIG. 6 shows the fitting of absorbance spectrum for determination of relative SWNT concentration.

To subtract the effects of the slowly varying background absorption from the measured optical absorption spectra, the derivative of the measured optical absorption with respect to wavelength was used. FIG. 6 shows the fitting of absorbance spectrum for determination of relative SWNT concentration. The absorbance spectrum is plotted as open triangles (left axis). The derivative of absorbance with respect to wavelength is plotted as open circles (right axis). The effects of background absorbencies are minimized by using the amplitude of the derivative (depicted by arrows) rather than the absolute absorbance.

In addition to using the derivative of the measured optical absorption with respect to wavelength as opposed to the absolute absorbance, it is assumed that the background absorption (from residual carbonaceous impurities, the tail of n-plasmon resonances, and off-resonance, neighboring absorbance peaks) was slowly varying with respect to wavelength in comparison with the variation near a first order, optical transition. This is a reasonable assumption because the line-width of a first order, optical transition of an isolated, semiconducting SWNT has been measured to be relatively narrow—about 25 meV. Furthermore, the spacing between the six transitions studied here is significantly greater than 25 meV (Table 1). A slowly varying background implies that the derivative of the background absorption is sufficiently small and can be ignored. It is also assumed that the line-shape of these transitions remain constant with concentration and buoyant density, as expected from Beer's law. An invariant line-shape implies that the derivative will be directly proportional to the amplitude of absorption. In this case, the relative amplitude of absorption can be measured using the derivative. To further eliminate small linear variations of the background absorbance with respect to wavelength, the maximum absolute value of the derivative to the right and left of each peak in optical absorption were averaged, and the averaged value was reported as the amplitude of absorbance and it is proportional to concentration (Beer's law). Referring to Table 1, it can be seen that three of the six optical transitions originate from two different chiralities of nanotubes.

TABLE 1

Assignment of near infrared absorption peaks.

| $\lambda_{11s}$ (nm) | Chiralities | Diameters (Å) |
| --- | --- | --- |
| 929 | (9, 1) | 7.57 |
| 991 | (6, 5), (8, 3) | 7.57, 7.71 |
| 1040 | (7, 5) | 8.29 |
| 1134 | (8,4), (7, 6) | 8.40, 8.95 |
| 1199 | (8, 6) | 9.66 |
| 1273 | (9, 5), (8, 7) | 9.76, 10.32 |

Analysis of Optical Spectra

A. Separation of CoMoCAT-Grown, SC-Encapsulated SWNTs

Initial SWNT dispersion: 6.2 mg raw CoMoCAT SWNTs were dispersed in 6.2 mL of 2% w/v sodium cholate (SC) via horn ultrasonication for 1 hour as described previously. Coarse aggregates and insoluble materials were then removed by a short ultracentrifugation step. This was implemented by filling two polycarbonate centrifuge tubes (Beckman-Coulter) with 3.0 mL of the ultrasonicated solution and separating at 54 krpm for 14 minutes (TLA100.3, 22° C.). Following the short ultracentrifugation, the top 2.5 mL of each centrifuge tube was decanted and saved for later separation in density gradients.

Density gradient centrifugation: The Beckman SW41 rotor was utilized for this sorting experiment. Gradients were formed directly in SW41-sized polyclear centrifuge tubes (Beckman-Coulter) using the linear gradient maker by the following procedure. First, the bottom of a centrifuge tube was filled with 1.5 mL of an underlayer consisting of 60% w/v iodixanol, 2% w/v SC, as described previously. Then, 3 mL of 7.5% w/v iodixanol, 2% w/v SC and 3 mL of 22.5% w/v iodixanol, 2% w/v SC were prepared and 2.5 mL of each was added to the mixing and reservoir chambers of the linear gradient maker, respectively. The linear gradient was delivered from the output of the gradient maker to slightly above (<2 mm) the underlayer in the centrifuge tube using a piece of glass tubing (inner diameter ~1 mm, length ~10 cm). The glass segment and the output of the linear gradient maker were connected via flexible tubing. Using this procedure, it was expected that the gradient maker would create an approximately linear density gradient that would vary from top to bottom from 7.5% w/v iodixanol to 22.5% w/v iodixanol, with equal concentrations of 2% w/v SC throughout. This expectation was confirmed by fractionating and measuring the density profile of a gradient immediately after formation.

After formation of the gradient, a 1.1 mL solution consisting of already dispersed SWNTs (as described above), 2% w/v SC, and 20% w/v iodixanol was created. To make this solution, 367 µL of 60% w/v iodixanol, 2% w/v SC and 733 µL of CoMoCAT SWNTs dispersed in 2% w/v SC were mixed. Then, 0.88 mL of this SWNT solution was slowly inserted (at a rate of 0.1 mL min$^{-1}$ using a syringe pump, PhD 2000, Harvard Apparatus, Inc.) into the previously made density gradient via a syringe needle inserted ⅝ of the way down the gradient. The height of the syringe needle was adjusted such that the SWNT solution was inserted where its density matched that of the previously formed gradient. Following insertion of the SWNT solution, the remainder of the centrifuge tube was filled with an overlayer consisting of 2% w/v SC (no iodixanol). The centrifuge tube was filled to ~4 mm from its top. Sorting occurred via ultracentrifugation at 41 krpm for 12.0 hours at 22° C.

Fractionation: After sorting via density gradient ultracentrifugation, the gradient was fractionated into 0.5 mm segments (70 µL). Each fraction was diluted to 1 mL and optically characterized as described previously.

Figures 7A, 7B:
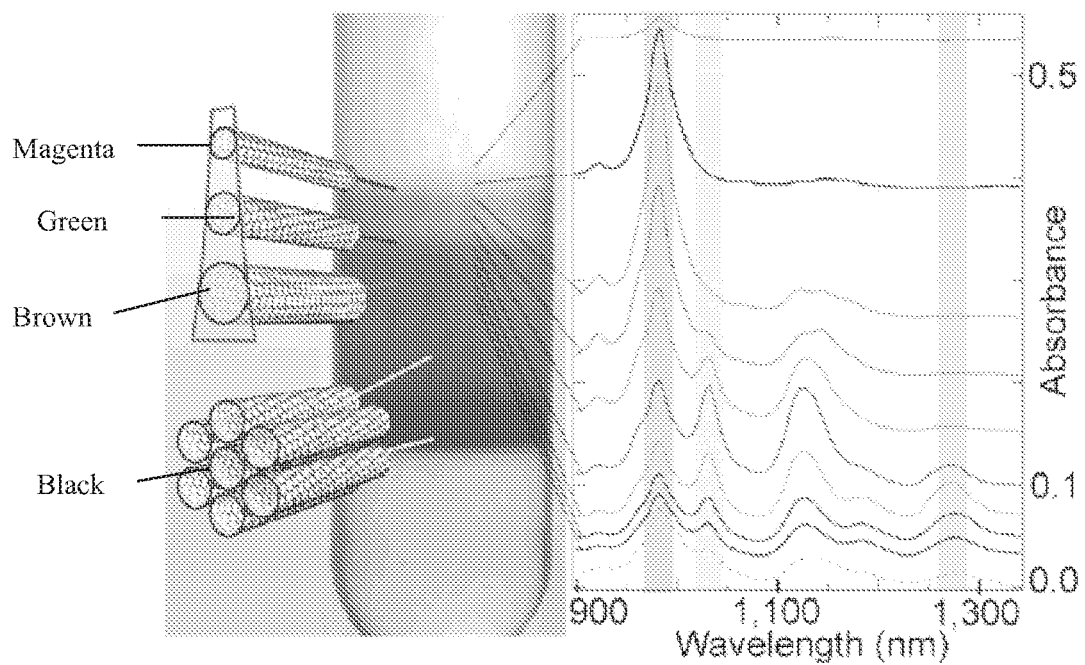
FIGS. 7A and 7B illustrate the separation of SC-encapsulated CoMoCAT-synthesized SWNTs (which have a diameter range of 7-11 Å) via density gradient ultracentrifugation.

FIGS. 7A and 7B illustrate the separation of SC-encapsulated CoMoCAT-synthesized SWNTs (which have a diameter range of 7-11 Å) via density gradient ultracentrifugation. FIG. 7A is a photograph of the centrifugation tube after a one-step separation. Referring to FIG. 7A, multiple regions of separated SWNTs are visible throughout the density gradient. The separation is evidenced by the formation of colored bands of isolated SWNTs sorted by diameter and band gap, with at least three different colored bands being clearly visible (from top to bottom: magenta, green, and brown). The different color bands correspond to different band gaps of the semiconducting tubes. Bundles, aggregates, and insoluble material sediment to lower in the gradient (as a black band).

FIG. 7B shows the optical absorbance spectra (1 cm path length) after separation using density gradient ultracentrifugation. SWNTs before purification are depicted as a dashed, gray line. As shown by the optical absorbance spectra in FIG. 7B, the amplitudes of optical absorbance for different transitions in the 900-1340 nm range (first order semiconducting transitions) also indicate separation by diameter and band gap. More specifically, the spectra illustrate that SWNTs of increasingly larger diameters are enhanced at increasingly larger densities.

The semiconducting first order transitions for SWNTs produced by the CoMoCAT method are spectrally located between 900-1340 nm, as described in the literature. Specifically, three diameter ranges of semiconducting SWNTs are highlighted (red, green, and blue; (6, 5), (7, 5) and (9, 5)/(8, 7) chiralities; 7.6, 8.3, and 9.8/10.3 Å in diameter; maximized in the 3rd, 6th, and 7th fractions, respectively). As described above, absorbance spectra were fit in this spectral range to determine the concentration of different semiconducting (n, m) chiralities. In some cases, several (n, m) chiralities overlap because they have first order transitions at similar wavelengths (Table 1). Generally, SWNTs with optical transitions at longer wavelengths are larger in diameter. Thus, by analyzing the strength of these transitions at different wavelengths as a function of density, it is possible to determine the density of SWNTs of different diameters (FIG. 6). However, the $E_{11}$ optical transitions are on top of a slowly varying background absorbance which was substrated as described above. The difference in density from the top fraction to the bottom fraction was measured to be 0.022 g cm$^{-3}$, and the density for the top fraction was measured to be 1.08±0.02 g cm$^{-3}$.

B. Separation of CoMoCAT-Grown, SDBS-Encapsulated SWNTs

Initial SWNT dispersion: 3.8 mg raw CoMoCAT SWNTs were dispersed in 3.8 mL of 2% w/v sodium dodecylbenzene sulfonate (SDBS) via horn ultrasonication for 1 hour. Coarse aggregates and insoluble materials were then removed by a short ultracentrifugation step. This was implemented by filling one polycarbonate centrifuge tube (Beckman-Coulter) with 3.0 mL of the ultrasonicated solution and separating at 27 krpm for 45 minutes (TLA100.3, 22° C.). Following the short ultracentrifugation, the top 2.5 mL of each centrifuge tube was decanted and saved for later separation in density gradients.

Density gradient centrifugation: The Beckman TLA100.3 rotor was utilized for this sorting experiment. A gradient was formed directly in a TLA100.3-sized polycarbonate centrifuge tube (Beckman-Coulter) by layering. Three discrete solutions of 1.0 mL were layered on top of each other in the centrifuge tubes by hand using a Pasteur pipette. The bottom layer consisted of 40% w/v iodixanol, 2% w/v SDBS. The middle layer consisted of 20% w/v iodixanol, 2% w/v SDBS. The top layer consisted of 10% w/v iodixanol and 2% w/v SDBS. Specifically, this layer was created by mixing 166 µL 60% w/v iodixanol with 834 µL of SWNTs dispersed in 2% w/v SDBS.

After layering, the gradient was tilted to ~80 degrees from vertical for 1 hour to allow for diffusion of iodixanol into an approximately linear profile. After the diffusion step, sorting was induced by ultracentrifugation at 64 krpm for 9 hours at 22° C.

Fractionation: After sorting via density gradient ultracentrifugation, the gradient was fractionated into 25 µL segments. Each fraction was diluted to 1 mL and optically characterized as described above.

Figures 8A, 8B:
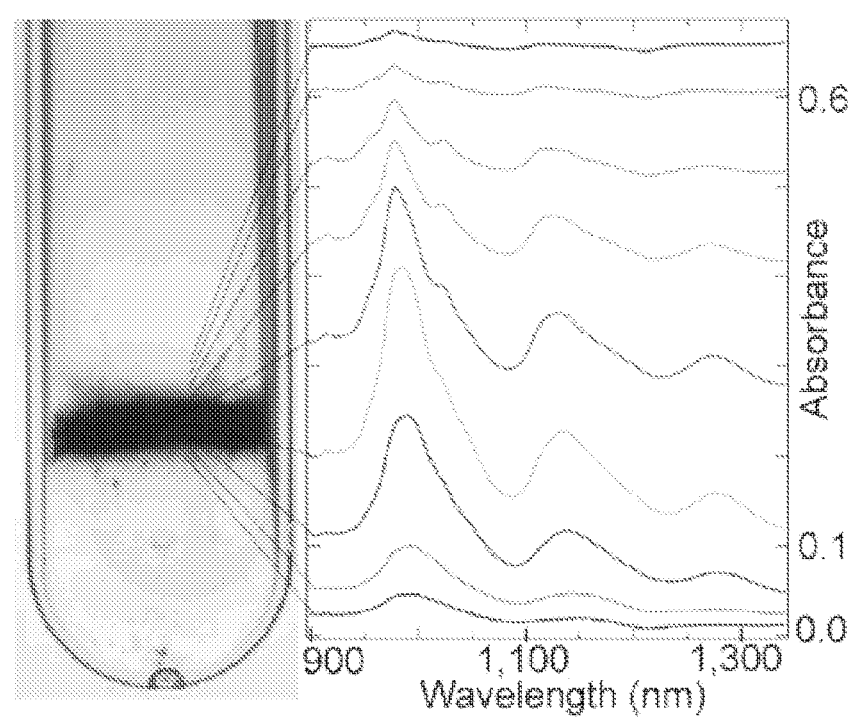
FIGS. 8A and 8B illustrate the separation of SDBS-encapsulated CoMoCAT-synthesized SWNTs via density gradient ultracentrifugation.

FIGS. 8A and 8B illustrate the separation of SDBS-encapsulated CoMoCAT-synthesized SWNTs via density gradient ultracentrifugation. FIG. 8A is a photograph of the centrifugation tube after a one-step separation. Referring to FIG. 8A, it can be seen that, in contrast to SC-encapsulated SWNTs, all of the SDBS-encapsulated SWNTs are compressed into a narrow black band. In the corresponding optical spectra FIG. 8B, it can also be seen that neither diameter nor band gap separation is indicated. The difference in density from the top fraction to the bottom fraction was measured to be 0.096 g cm$^{-3}$, and the density for the top fraction was measured to be 1.11±0.02 g cm$^{-3}$.

C. Separation of CoMoCAT-Grown SWNTs Using Other Single-Surfactant Systems

Following procedures similar to those described above but using three other single-surfactant systems, a similar correlation between diameter and density was observed for the cases of sodium deoxycholate (FIG. 9A) and sodium taurodeoxycholate (FIG. 9B). However, for the case of sodium dodecyl sulfonate (SDS) (FIG. 9C), separation as a function of diameter was absent.

D. Separation of Laser Ablation-Synthesized SWNTs

SWNTs in the 11-16 Å diameter range synthesized by the laser ablation growth method were purified using SC-encapsulations. Procedures identical to those described in Section A above were used except for the following changes: (1) SWNTs grown by the laser-ablation method were used instead of SWNTs grown by the CoMoCAT method; (2) 10.0% and 25.0% w/v iodixanol solutions were used instead of the 7.5% and 22.5% w/v iodixanol solutions, respectively, during linear density gradient formation; (3) the solution containing SWNTs was prepared as a 24.1% w/v iodixanol solution rather than a 20.0% w/v iodixanol solution before insertion into the gradient.

Figures 10A, 10B:
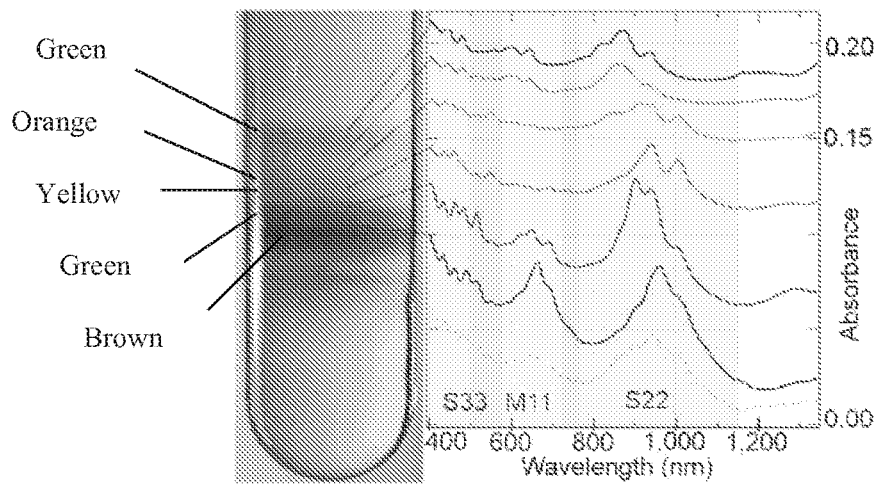
FIGS. 10A and 10B illustrate the separation of SC-encapsulated laser ablation-synthesized SWNTs via density gradient ultracentrifugation.

FIGS. 10A and 10B illustrate the separation of SC-encapsulated laser ablation-synthesized SWNTs via density gradient ultracentrifugation. FIG. 10A is a photograph of the centrifugation tube after a one-step separation. Referring to FIG. 10A, colored bands of SWNTs are apparent, suggesting separation by electronic-structure. Specifically, five or more colored bands are visible (from top to bottom: a first green band, an orange band, a yellow band, a second green band, and a brown band). Also the trend of increasing density with increasing diameter also was observed. The difference in density from the top fraction to the bottom fraction was measured to be 0.026 g cm$^{-3}$, and the density for the bottom fraction was measured to be 1.08±0.02 g cm$^{-3}$.

FIG. 10B shows the optical absorbance spectra (1 cm path length) after separation using density gradient ultracentrifugation. SWNTs before purification is depicted as a dashed, gray line. In the optical absorbance spectra of FIG. 10B, the second and third order semiconducting and first order metallic optical transitions are labeled S22, S33, and M11, respectively. The diameter separation was observed as a red-shift in the emphasis in the S22 optical transitions (second-order optical absorbance transitions for semiconducting SWNTs, 800-1075 nm) with increasing density. Moreover, an enrichment of these SWNTs by electronic type was also detected. In the most buoyant fractions, an enhancement in concentration of semiconducting SWNTs was observed with respect to metallic SWNTs, which have first-order optical absorbance transitions ranging from 525 to 750 nm (the metallic SWNTs (M11) were depleted in the most buoyant fractions).

Example 2: Multiple Cycles of Density Gradient Ultracentrifugation

The degree of isolation achieved after a single step of the technique is limited by the diffusion of SWNTs during ultracentrifugation, mixing during fractionation, and statistical fluctuations in surfactant encapsulation. To overcome these limitations and improve the sorting process, the centrifugation process can be repeated for multiple cycles. For example, after the first iteration of density gradient centrifugation, subsequent fractionation, and analysis of the optical absorbance spectra of the collected fractions, the fractions containing the largest concentration of the target chirality or electronic type of interest can be combined. The density and volume of the combined fractions can then be adjusted by the addition of iodixanol and water, both containing surfactant/encapsulation agent (usually at 2% w/v surfactant). This sorted sample can then be inserted into a second density gradient, centrifuged, and the entire protocol can be repeated. This process can be repeated for as many iterations as desired. This enables the optimal isolation of a targeted electronic type or a specific chirality of SWNT.

To demonstrate the approach, the enrichment of the (6, 5) and (7, 5) chiralities of semiconducting SWNTs was targeted (7.6 and 8.3 Å in diameter, respectively), and photoluminescence spectra were obtained to show quantitatively the improvements in separation by repeated centrifugation.

Initial SWNT dispersion: Four solutions, each consisting of 6.2 mg raw CoMoCAT SWNTs and 6.2 mL of 2% w/v sodium cholate, were created. The SWNTs in each solution were dispersed via horn ultrasonication for 1 hour as described previously. Coarse aggregates and insoluble materials were then removed by a short ultracentrifugation step. This was implemented by filling eight polycarbonate centrifuge tubes (Beckman-Coulter) with 3.0 mL of the ultrasonicated solutions and separating at 54 krpm for 14 minutes (TLA100.3, 22° C.). Following the short ultracentrifugation, the top 2.5 mL of each of the eight centrifuge tubes was decanted and saved for concentration.

After initial dispersion, these SWNTs were then concentrated in preparation for the first iteration of density gradient ultracentrifugation. Six SW41 polyclear centrifuge tubes (Beckman-Coulter) were each filled with 8.62 mL of 60% w/v iodixanol, 2% w/v SC, which served as stop layers. Then, on top of each of these dense stop layers, 3.0 mL of initially dispersed SWNTs was added to fill the centrifuge tubes to ~4 mm from their tops. The SWNTs were then concentrated via ultracentrifugation at 41 krpm at 22° C. for 7.5 hours, as depicted in FIG. 5. Afterwards, each centrifuge tube was fractionated and the concentrated SWNTs were extracted in 0.7 cm (0.98 mL) fractions. The end result was a concentration by a factor of three. All of the concentrated fractions were combined and the buoyant density of the combined fractions containing the concentrated SWNTs measured 1.12 g cm$^{-3}$. The density of this combined solution was then reduced to 1.105 g cm$^{-3}$ by adding 2% w/v SC.

Density gradient centrifugation: The Beckman SW41 rotor was utilized. Gradients were formed directly in SW41-sized polyclear centrifuge tubes (Beckman-Coulter) using the linear gradient maker. Underlayers or overlayers were not used. Stock solutions of ~100 mL of 8.9% w/v iodixanol, 2% w/v SC and of 25.9% w/v iodixanol, 2% w/v SC were prepared. 5.5 mL of each was added to the mixing and reservoir chambers of the linear gradient maker, respectively. The linear gradient was delivered from the output of the gradient maker to the bottom of a centrifuge tube using a piece of glass tubing.

After the formation of a gradient, 0.88 mL of SWNT solution (1.105 g cm$^{-3}$) was slowly inserted (0.1 mL min$^{-1}$) via a syringe needle and the height of the syringe needle was adjusted such that the SWNT solution was inserted where its density matched that of the local density gradient. Sorting occurred via ultracentrifugation at 40 krpm for 24 hours at 22° C.

Fractionation: After sorting via density gradient ultracentrifugation, each gradient was fractionated into 0.66 mm segments (93 μL). Some fractions were diluted to 1 mL and optically characterized. Other fractions were not diluted and were saved for further sorting in subsequent density gradients.

Iterations: 1$^{st}$ iteration: Concentrated tubes were separated in six gradients. All six were prepared and fractionated identically. One of the six sets of fractions was diluted for optical characterization to determine the fractions most enriched in the (6, 5) or (7, 5) chiralities. Once this determination had been made, the best six fractions enriched in either the (6, 5) or (7, 5) chirality from each of the remaining five sets of fractions were combined. The densities of (6, 5) and the (7, 5) combinations were adjusted to 1.105 g cm$^{-3}$.

2$^{nd}$ iteration: The best (6, 5) and (7, 5) fractions resulting from the first iteration were then separated in fresh density gradients. The SWNTs enriched in the (6, 5) chirality were separated in three gradients and the SWNTs enriched in the (7, 5) chirality were separated in three gradients. Identical ultracentrifuge parameters were used for the first and second iterations. Again after density gradient ultracentrifugation, one set of fractions was diluted for the measurement of optical absorbance spectra to determine the fractions that were optimally enriched in the desired, targeted chirality of interest. Each of the best (6, 5) fractions and the best (7, 5) fractions were combined and their density was adjusted to 1.105 g cm$^{-3}$.

3$^{rd}$ iteration: The best (6, 5) and (7, 5) fractions resulting from the second iteration were then separated in fresh density gradients identical to those used in the first iteration, except 20 mM Tris was added throughout each gradient to raise the pH to 8.5 to optimize the isolation of the (7, 5) chirality of SWNT. One gradient was run for the (6, 5) SWNTs and another for the (7, 5) SWNTs. Each gradient was fractionated into 0.066 mm fractions, and all the fractions were diluted and analyzed using photoluminescence techniques as described below.

Measurement of Photoluminescence Spectra

Figure 11A:
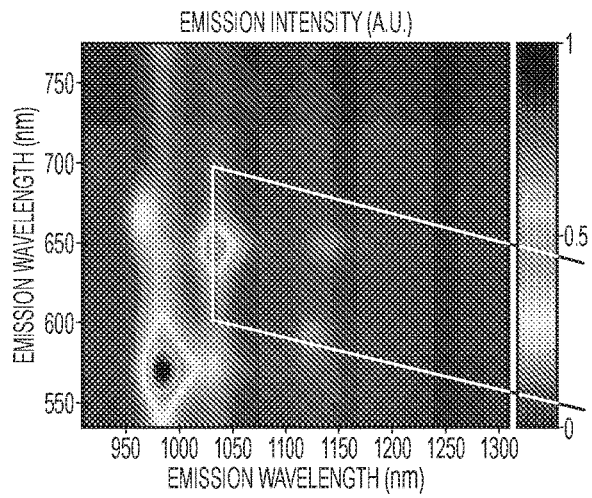
FIGS. 11A-11D shows the fitting of photoluminescence spectrum for determination of relative SWNT concentration.
Figure 11B:
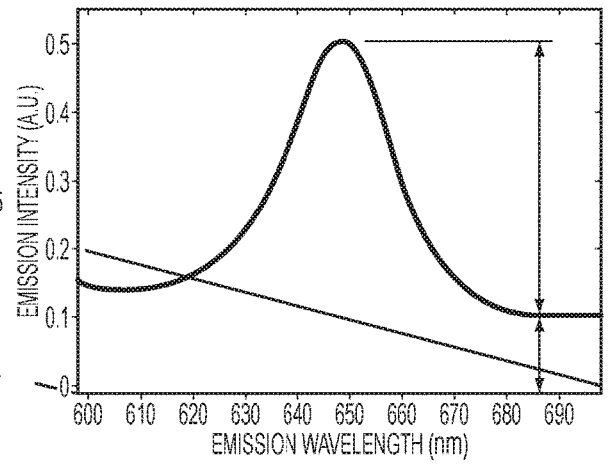
Figure 11C:
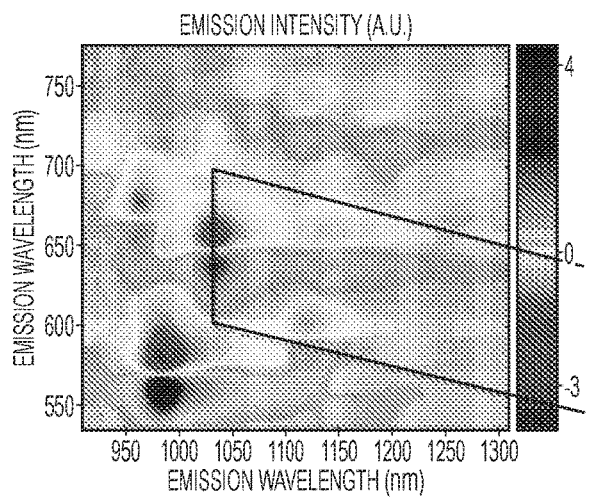
Figure 11D:
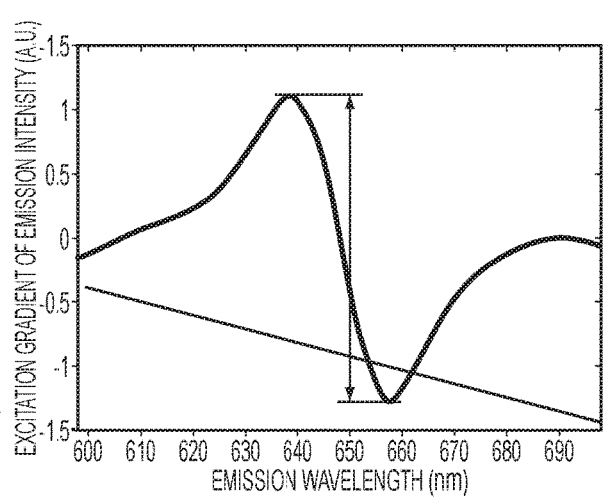

Photoluminescence spectra were measured using a Horiba Jobin-Yvon (Edison, N.J.) Nanolog-3 fluorimeter with a double excitation-side and a single emission-side monochromator, both set to band pass slit widths ranging from of 10-14.7 nm. The photoluminescence was detected using a liquid nitrogen cooled InGaAs photodiode. A 3-mm thick RG-850 Schott glass filter (Melles Griot, Carlsbad, Calif.) was used to block second order Rayleigh scattering in the emission monochromator. A 495-nm cutoff, long-pass filter (FGL495S, Thorlabs, Newton, N.J.) was used to block second order Rayleigh scattering in the excitation monochromators. Matrix scans in which the excitation wavelength was varied from 525 to 825 nm in 6 nm increments and the emission wavelength was varied from 900 to 1310 nm were collected with integration times ranging from 0.5-2.5 s. To determine concentration from emission-excitation matrices, excitation scans were interpolated along the excitation axis through the $E_{22}$ transition at an emission wavelength corresponding to the $E_{11}$ wavelength. FIGS. 11A-11D illustrate the fitting of photoluminescence spectra for determination of relative SWNT concentration. FIG. 11A plots photoluminescence intensity as a function of excitation and emission wavelengths (vertical and horizontal axes, respectively). FIG. 11B plots photoluminescence intensity versus excitation wavelength at 740 nm. Both broadly varying background photoluminescence from off resonance SWNTs and emission from the (7, 5) semiconducting SWNT were observed (black arrows). To minimize the effects of the slowly varying background, a derivative method similar to that applied to analyze absorbance spectra was then applied to extract the relative concentration of specific (n, m) chiralities. Specifically, the partial derivative of photoluminescence intensity versus excitation wavelength was computed (FIGS. 11C and 11D). The strength of the (7, 5) chirality (proportional to concentration) was determined from the amplitude of the partial derivative, depicted as a black line in FIG. 11D. The effects of re-absorption of emitted photoluminescence and the decay the excitation beam intensities were also corrected.

Analysis of Photoluminescence Spectra

The data obtained in this example illustrate how successive separations of SC-encapsulated SWNTs can lead to much improved isolation of specific, targeted chiralities and produce corresponding increasingly narrow diameter distributions of SWNTs.

Figure 12:
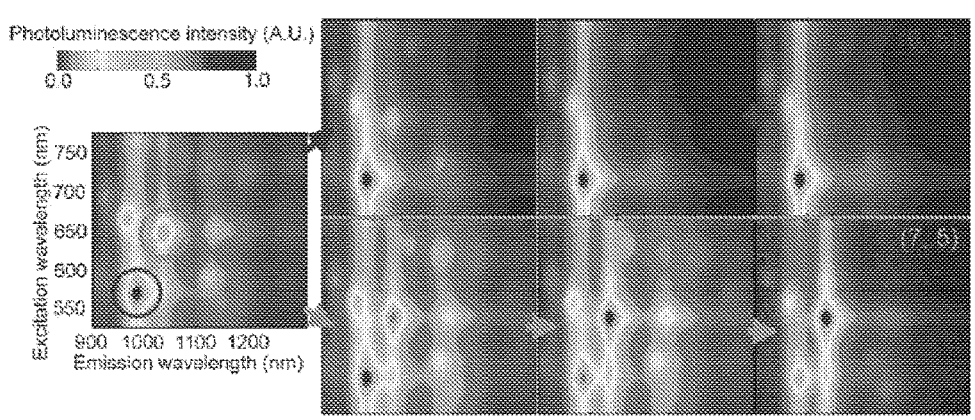
FIG. 12 plots photoluminescence intensities as a function of excitation and emission wavelengths for increasing refinement.

FIG. 12 depicts the photoluminescence intensity of semiconducting SWNTs as a function of excitation and emission wavelengths before and after each of three iterations of density gradient centrifugation. After each iteration, the relative concentrations of the (6, 5) and (7, 5) chiralities of semiconducting SWNTs was observed to have increased. After enriching the (6, 5) chirality (7.6 Å) three times, bulk solutions of the SWNTs were achieved in which >97% of the SWNTs are of the (6, 5), (9, 1), and (8, 3) chiralities (7.6 Å, 7.6 Å, and 7.8 Å in diameter, respectively) (Table 2). In other words, >97% of the SWNTs isolated from the third iteration were within 0.2 Å of the mean diameter (compared to 62.3% from the initial population, 86% after the 1$^{st}$ iteration, and 88.6% after the 2$^{nd}$ iteration). The (7, 5) optimization rendered the (7, 5) chirality dominant after repeated separations. Further improvements in purity can be expected with additional cycles. Table 2 below shows the quantitative concentrations of individual chiralities of SWNTs as determined through analysis of the photoluminescence spectra using the partial derivative method described above.

TABLE 2

Concentration of (n, m) chiralities of SWNTs as determined from photoluminescence spectra depicted in FIG. 12.

| | | (6, 5) optimization | | | (7, 5) optimization | | |
|---|---|---|---|---|---|---|---|
| | Initial | 1$^{st}$ | 2$^{nd}$ | 3$^{rd}$ | 1$^{st}$ | 2$^{nd}$ | 3$^{rd}$ |
| (6, 5) | 43.1% | 70.2% | 69.7% | 83.6% | 37.4% | 26.6% | 24.3% |
| (9, 1) | 2.4% | 2.5% | 3.0% | 2.4% | 1.8% | 1.5% | 2.2% |
| (8, 3) | 16.8% | 13.3% | 15.9% | 11.0% | 12.7% | 10.5% | 10.3% |
| (9, 2) | 0.9% | 0.5% | 0.7% | 0.0% | 1.3% | 0.8% | 1.3% |
| (7, 5) | 21.1% | 8.1% | 4.0% | 0.7% | 27.3% | 40.5% | 58.6% |
| (8, 4) | 4.9% | 3.5% | 4.7% | 1.5% | 6.5% | 6.7% | 0.9% |
| (10, 2) | 1.6% | 1.4% | 1.6% | 0.6% | 2.0% | 3.0% | 0.1% |
| (7, 6) | 5.0% | 0.4% | 0.3% | 0.1% | 5.2% | 6.8% | 1.8% |
| (9, 4) | 1.6% | 0.0% | 0.0% | 0.0% | 3.5% | 0.9% | 0.0% |
| (8, 6) | 1.6% | 0.0% | 0.0% | 0.0% | 1.5% | 1.8% | 0.0% |
| (9, 5) | 0.3% | 0.0% | 0.0% | 0.0% | 0.3% | 0.6% | 0.0% |
| (8, 7) | 0.7% | 0.1% | 0.1% | 0.0% | 0.4% | 0.3% | 0.4% |

FIGS. 13A and 13B show optical spectra corresponding to the photoluminescence spectra in FIG. 12. FIG. 13A shows absorbance spectra from the (6, 5) optimization. Starting from the unsorted material (dashed grey line, unsorted), the relative strengths of the (6, 5) chirality optical transitions at 471 nm and 982 nm (highlighted) are increasingly reinforced with each iteration. FIG. 13B shows absorbance spectra from the (7, 5) optimization. Over three iterations of sorting, the (7, 5) optical transition at 1031 nm (highlighted) is strongly enhanced compared to the unseparated material (dashed grey line, unsorted).

Example 3: Adjustment of pH and Addition of Co-Surfactants

While the purification of SWNTs can be significantly enhanced via multiple cycles of ultracentrifugation as demonstrated in Example 2 above, further improvements can be realized by optimizing the effectiveness of a single cycle through tuning of the structure-density relationship for SWNTs. For example, by adjusting the pH or by adding competing co-surfactants to a gradient, the purification of a specific diameter range or electronic type can be targeted. In this example, improvements in isolating SWNTs of specific, targeted diameters and electronic types were demonstrated by separating SC-encapsulated CoMo-CAT-grown SWNTs at pH 7.4 versus at pH 8.5, and using a co-surfactant system (1:4 SDS:SC (by weight) and 3:2 SDS:SC (by weight)) to separate CoMoCAT-grown and laser ablation-synthesized SWNTs. Co-surfactant systems having other ratios also can be used. For example, the ratio (by weight) of an anionic alkyl amphiphile (e.g., SDS, SDBS, or combinations thereof) to a bile salt (e.g., SC, sodium deoxycholate, sodium taurodeoxycholate, or combinations thereof) can be about 1:10 to about 2:1, such as about 1:8, about 1:6, about 1:4, about 1:3, about 1:2, about 3:4, about 1:1, about 5:4, about 6:5, about 3:2, about 7:4, about 2:1. In certain embodiments, the ratio can be about 1:10 to about 1:2, such as about 1:8 to about 1:3. In other embodiments, the ratio can be about 5:4 to about 2:1, such as about 6:5 to about 7:4.

A. Effect of pH

Procedures

Separation of SC-encapsulated CoMoCAT-grown SWNTs at pH 7.4: Same procedures as those described in Example 1, Section A were used.

Separation of SC-encapsulated CoMoCAT-grown SWNTs at pH 8.5: Same procedures as those described in Example 1, Section A were used except 20 mM Tris was added throughout the gradient to raise the pH to 8.5 (but not during the initial SWNT dispersion phase).

Analysis

Figure 14A:
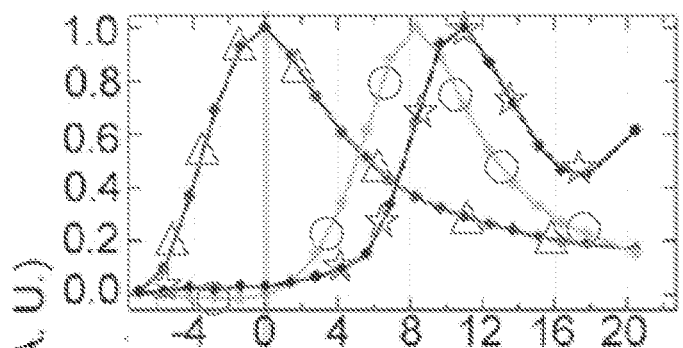
FIGS. 14A-14C plot the concentration of the (6, 5), (7, 5) and (9, 5)/(8, 7) chiralities of CoMoCAT-grown SWNTs (indicated by open triangles, open circles, and open star symbols, respectively) against density: (a) SC, no buffer, pH=7.4 (FIG. 14A); (b) SC, 20 mM Tris buffer, pH, 8.5 (FIG. 14B); (c) SC with the addition of SDS as a co-surfactant (1:4 ratio by weight, SDS:SC) (FIG. 14C).
Figure 14B:
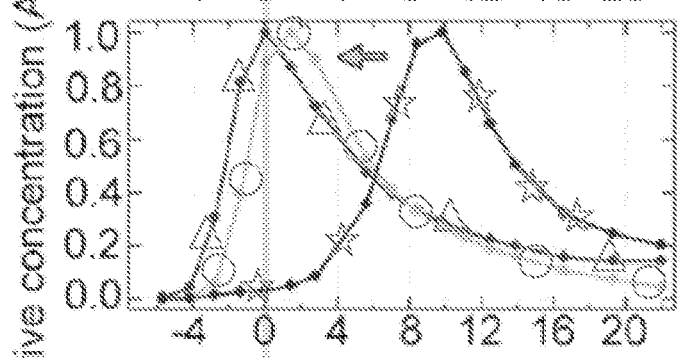

The relative concentration of several different diameters (7.6 Å–(6, 5) as open triangles, 8.3 Å–(7, 5) as open circles, and 9.8/10.3 Å–(9, 5)/(8, 7) as open star symbols) of SWNTs is plotted against density for the cases of SC-encapsulated SWNTs at pH 7.4 in FIG. 14A and of SC-encapsulated SWNTs at pH 8.5 in FIG. 14B. Concentrations were determined from absorbance spectra via the derivative method described above (FIG. 6 and FIG. 7B). The density for the fractions with the highest (6, 5) chirality relative concentration was measured to be $1.08 \pm 0.02$ g cm$^{-3}$.

Comparing FIG. 14B with FIG. 14A, it can be seen that by increasing the pH to 8.5, the SWNTs near 8.3 Å in diameter shifted to more buoyant densities, enabling optimal separation of SWNTs in the 9.8/10.3 Å range ((9, 5)/(8, 7) chiralities).

B. Use of Co-Surfactant Systems

Procedures

Separation of CoMoCAT-grown SWNTs based on nanotube diameter dimensions using a co-surfactant system including 1:4 SDS:SC (by weight): Same procedures as those described in Example 1, Section A, were used except for the following changes: (1) 15.0% and 30.0% w/v iodixanol solutions were used instead of the 7.5% and 22.5% w/v iodixanol solutions, respectively, during linear density gradient formation; (2) the solution containing SWNTs was prepared as a 27.5% w/v iodixanol solution rather than a 20.0% w/v iodixanol solution before insertion into the gradient; and (3) a 1:4 ratio by weight of SDS:SC, 2% w/v overall, was utilized during density gradient ultracentrifugation instead of a single surfactant solution of only 2% w/v SC. Thus, each part of the gradient contained 0.4% w/v SDS and 1.6% w/v SC. However, the SWNTs were still initially dispersed via ultrasonication in single surfactant solutions of SC and that co-surfactant, in all cases SDS, was only introduced at the density gradient ultracentrifugation stage.

Separation of HiPCO-grown SWNTs based on nanotube diameter dimensions using a co-surfactant system including 1:4 SDS:SC (by weight): Same procedures as those described immediately above for separation of CoMoCAT-grown SWNTs were followed except that HiPCO-grown SWNTs (raw, not purified) from Carbon Nanotechnologies, Inc. were used rather than CoMoCAT-grown SWNTs.

Separation of laser ablation-synthesized SWNTs based on electronic type (semiconducting) using a co-surfactant system including 1:4 SDS:SC (by weight): Same procedures as those described in Example 1, Section A were used except for the following changes: (1) SWNTs grown by the laser-ablation method were used instead of SWNTs grown by the CoMoCAT method; (2) 15.0% and 30.0% w/v iodixanol solutions were used instead of the 7.5% and 22.5% w/v iodixanol solutions, respectively, during linear density gradient formation; (3) the solution containing SWNTs was prepared as a 27.5% w/v iodixanol solution rather than a 20.0% w/v iodixanol solution before insertion into the gradient; and (4) a 1:4 ratio by weight of SDS:SC, 2% w/v overall, was utilized during density gradient ultracentrifugation instead of a single surfactant solution of only 2% w/v SC. Thus, each part of the gradient contained 0.4% w/v SDS and 1.6% w/v SC.

Separation of laser ablation-synthesized SWNTs based on electronic type (semiconducting) using a co-surfactant system including 3:7 SDS:SC (by weight): Same procedures as those described immediately above were followed, except that a 3:7 ratio by weight of SDS:SC, 2% w/v overall, was utilized during density gradient ultracentrifugation instead of the 1:4 SDS:SC, 2% w/v overall, co-surfactant system. Thus, each part of the gradient contained 0.6% w/v SDS and 1.4% w/v SC.

Separation of laser ablation-synthesized SWNTs based on electronic type (metallic) using a co-surfactant system including 3:2 SDS:SC (by weight): Same procedures as those described in Example 1, Section A were used except for the following changes: (1) SWNTs grown by the laser-ablation method were used instead of SWNTs grown by the CoMoCAT method; (2) 20.0% and 35.0% w/v iodixanol solutions were used instead of the 7.5% and 22.5% w/v iodixanol solutions, respectively, during linear density gradient formation; (3) the solution containing SWNTs was prepared as a 32.5% w/v iodixanol solution rather than a 20.0% w/v iodixanol solution before insertion into the gradient; and (4) a 3:2 ratio by weight of SDS:SC, 2% w/v overall, was utilized during density gradient ultracentrifugation instead of a single surfactant solution of only 2% w/v SC. Thus, each part of the gradient contained 1.2% w/v SDS and 0.8% w/v SC.

Separation of laser ablation-synthesized SWNTs of three different origins based on electronic type (semiconducting) using a co-surfactant system including 1:4 SDS:SC (by weight): Same procedures as those described above in connection with separation of laser ablation-synthesized SWNTs based on electronic type (semiconducting) using a co-surfactant system including 1:4 SDS:SC (by weight) were followed except that SWNTs of three different origins were tested: (1) raw, unpurified laser ablation-synthesized SWNTs obtained from Carbon Nanotechnologies, Inc.; (2) nitric acid purified laser ablation-synthesized SWNTs obtained from IBM (Batch A); and (3) nitric acid purified laser ablation-synthesized SWNTs obtained from IBM (Batch B).

For co-surfactant based separation by electronic type, the gradient-portion linearly varied from 15% w/v (1.08 g cm$^{-3}$) at the top to 30% w/v (1.16 g cm$^{-3}$) at the bottom or from 20% w/v (1.11 g cm$^{-3}$) at the top to 35% w/v (1.19 g cm$^{-3}$) at the bottom.

Analysis

Figure 14C:
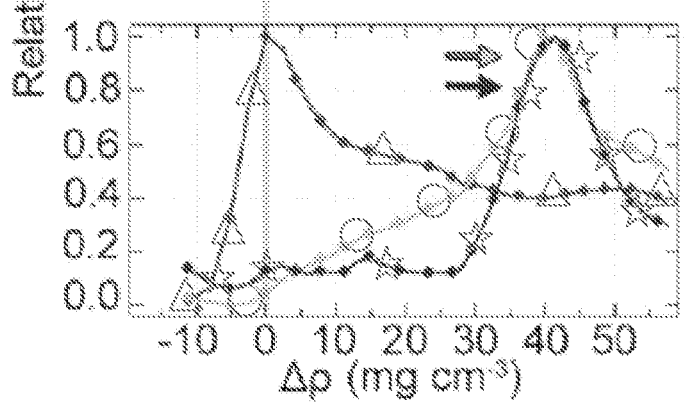

1. Separation of CoMoCAT-Grown SWNTs Based on Nanotube Diameter Dimensions Using a Co-Surfactant System Similar to FIGS. 14A and 14B, the relative concentration of several different diameters (7.6, 8.3, and 9.8/10.3 Å) of SWNTs is plotted against density for a mixture of 1:4 SDS:SC (by weight) in FIG. 14C. Comparing FIG. 14C to FIG. 14A, it can be seen that by adding SDS to compete with the SC for non-covalent binding to the nanotube surface, the SWNTs in the 8.3 and 9.8/10.3 Å diameter regime shifted to significantly larger buoyant densities, enabling optimal separation of SWNTs near 7.6 Å in diameter ((6, 5) chirality).

Figure 15A:
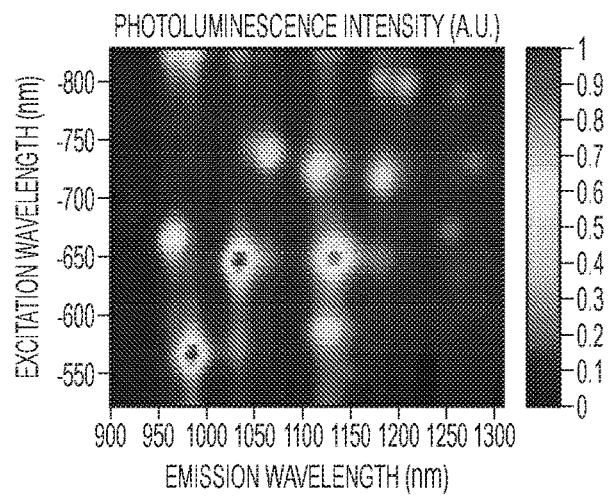
FIGS. 15A-15C plot photoluminescence intensities as a function of excitation and emission wavelengths.

2. Separation of HiPCO-Grown SWNTs Based on Nanotube Diameter Dimensions Using a Co-Surfactant System FIG. 15A depicts the photoluminescence intensity of a heterogeneous population of HiPCO-grown SWNTs as a function of excitation and emission wavelengths before density gradient centrifugation. As shown in FIG. 15A, one of the strongest signals were observed at an emission wavelength of about 980 nm (and an excitation wavelength of about 570 nm), which corresponds to a nanotube diameter dimensions of about 7.5 Å. A barely noticeable signal was observed at an emission wavelength of about 1190 nm (and an excitation wavelength of about 800 nm), and at an emission wavelength of about 1210 nm (and an excitation wavelength of about 790 nm), both of which correspond to a nanotube diameter dimensions of about 10.5 Å.

Figure 15B:
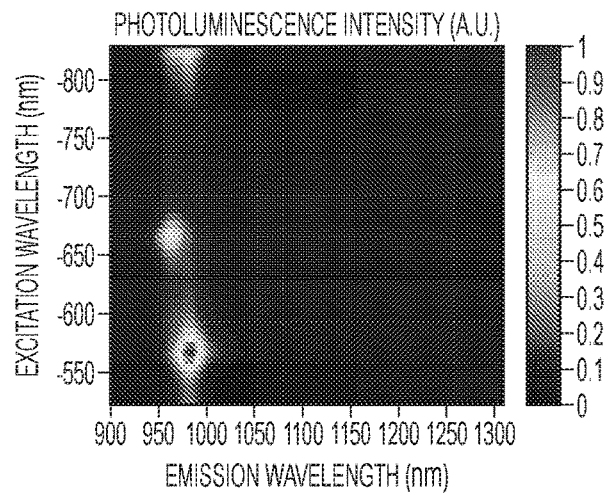
Figure 15C:
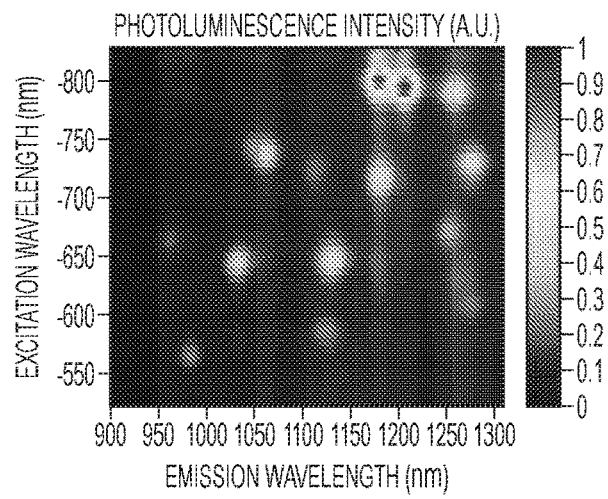

Following density gradient centrifugation using a co-surfactant system including 1:4 SDS:SC (by weight), two separation fractions were obtained. The photoluminescence spectra of the two separation fractions are shown in FIGS. 15B and 15C, respectively. As shown in FIG. 15B, one of the two separation fractions contained predominantly nanotubes that emit at an emission wavelength in the range of about 960 nm to about 980 nm. More specifically, the strongest signal was observed at an emission wavelength of about 980 nm (and an excitation wavelength of about 570 nm). The spectra indicate that this separation fraction contained predominantly single-walled carbon nanotubes having a diameter dimension of about 7.5 Å. By comparison, in the spectra shown in FIG. 15C, a number of signals were observed at different emission and excitation wavelengths. However, the signals within the emission wavelength range of about 960 nm to about 980 nm were highly suppressed, while the signals at the emission/excitation wavelengths of about 1190/800 nm and about 1210/790 nm (which were barely noticeable in FIG. 15A) have become the strongest, indicating that in this separation fraction, the concentration of single-walled carbon nanotubes having a diameter dimension of about 10.5 Å has considerably increased compared to the pre-sorted sample. Accordingly, the spectra of FIGS. 15A-15C together show that separation by nanotube diameter dimensions also was possible with HiPCO-grown SWNTs, and can be achieved with good results using, for example, the co-surfactant system described above.

Figures 16A, 16B:
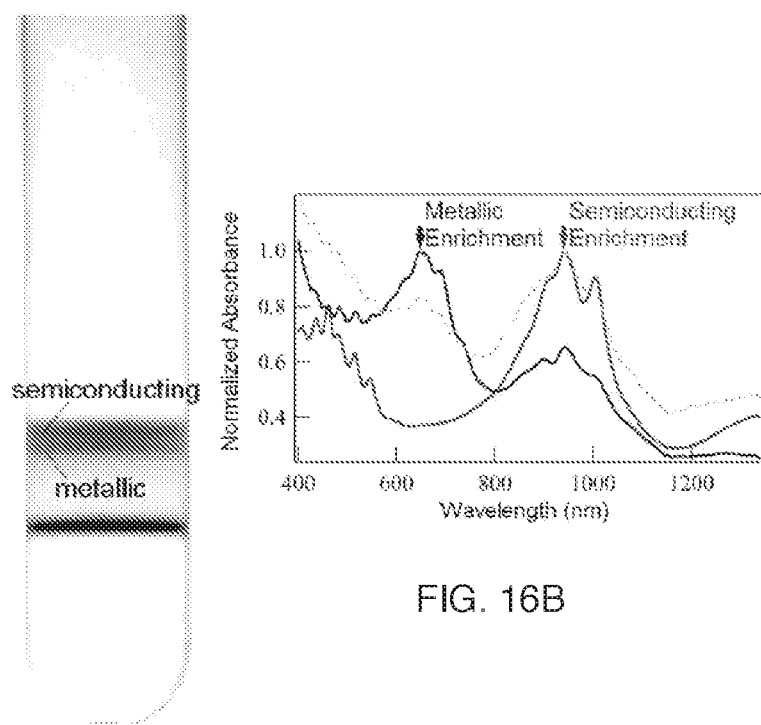
FIGS. 16A and 16B show the optimization of separation by electronic type by using competing mixture of co-surfactants.

3. Separation of Laser Ablation-Synthesized SWNTs Based on Electronic Type Using a Co-Surfactant System Co-surfactant populations were observed to have an even greater effect on the optimization of metal-semiconductor separation for SWNTs in the 11-16 Å diameter regime. FIG. 16A is a photograph of laser-ablation-synthesized SWNTs separated in a co-surfactant system (1:4 SDS:SC). As shown in FIG. 16A, only three bands were observed. The difference in density between the two bands was measured to be 0.006 g cm$^{-3}$, and the density for the top band was measured to be 1.12±0.02 g cm$^{-3}$. From the measured optical absorbance spectra (FIG. 16B), it appears that the top band (orange hue) consists of predominantly semiconducting SWNTs (plotted in blue in FIG. 16B), and that the band just below the top band (green hue) is highly enriched in metallic SWNTs, although some semiconducting SWNTs remain (plotted in red in FIG. 16B). The absorbance spectrum of the heterogeneous mixture before sorting is plotted as a dashed grey line in FIG. 16B.

Figure 17:
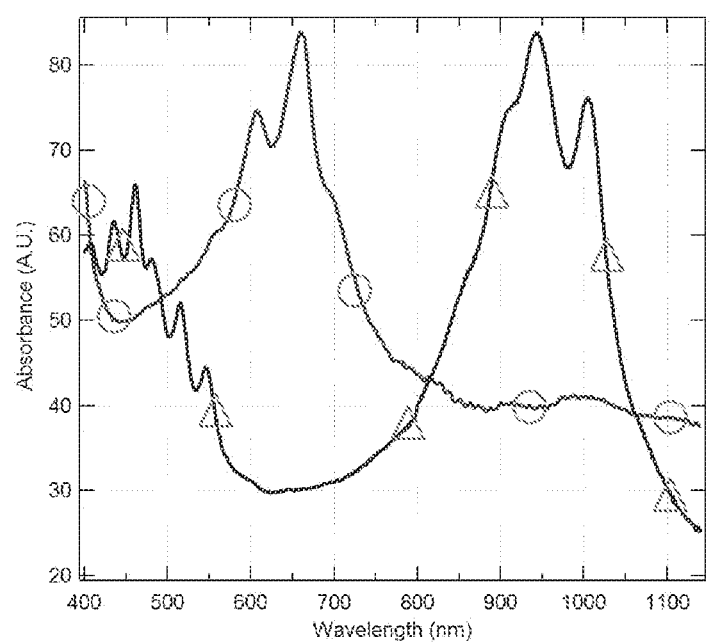
FIG. 17 shows the optical absorbance spectra of laser-ablation-synthesized SWNTs separated in co-surfactant systems optimized for separating predominantly metallic SWNTs (3:2 SDS:SC) and predominantly semiconducting SWNTs (3:7 SDS:SC).
Figure 18:
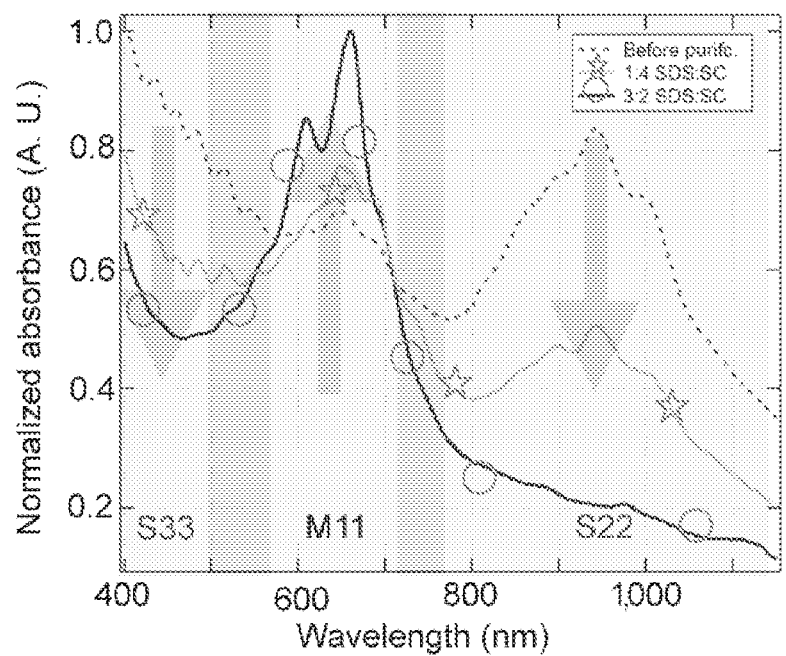
FIG. 18 compares the optical absorbance spectra of the isolated predominantly metallic SWNT fraction using a 3:2 SDS:SC co-surfactant system (optimized, as open circles, FIG. 17) versus a 1:4 SDS:SC co-surfactant system (unoptimized, as open star symbols, FIG. 16B).

It was observed that further tuning of the co-surfactant mixture to a 3:2 SDS:SC ratio permitted significantly improved isolation of metallic laser ablation synthesized SWNTs. Improvements with isolation of semiconducting laser ablation synthesized SWNTs also were observed when the 1:4 SDS:SC co-surfactant mixture was replaced with a 3:7 SDS:SC co-surfactant mixture. In FIG. 17, spectra corresponding to primarily metallic (3:2 SDS:SC, plotted as open circles) SWNTs and primarily semiconducting (3:7 SDS:SC, plotted as open triangles) SWNTs are shown. Improvements in the absorption signal in the M11 range can be more clearly seen in FIG. 18 (S6), which includes the unoptimized spectrum from FIG. 16B using the co-surfactant mixture of 1:4 SDS:SC (as open star symbols) and the optimized spectrum from FIG. 17 using the co-surfactant mixture of 3:2 SDS:SC (as open circles). The arrows highlight the strengthening of the signal in the M11 range, and the suppression of the signals in the S33 and S22 ranges.

Figure 19:
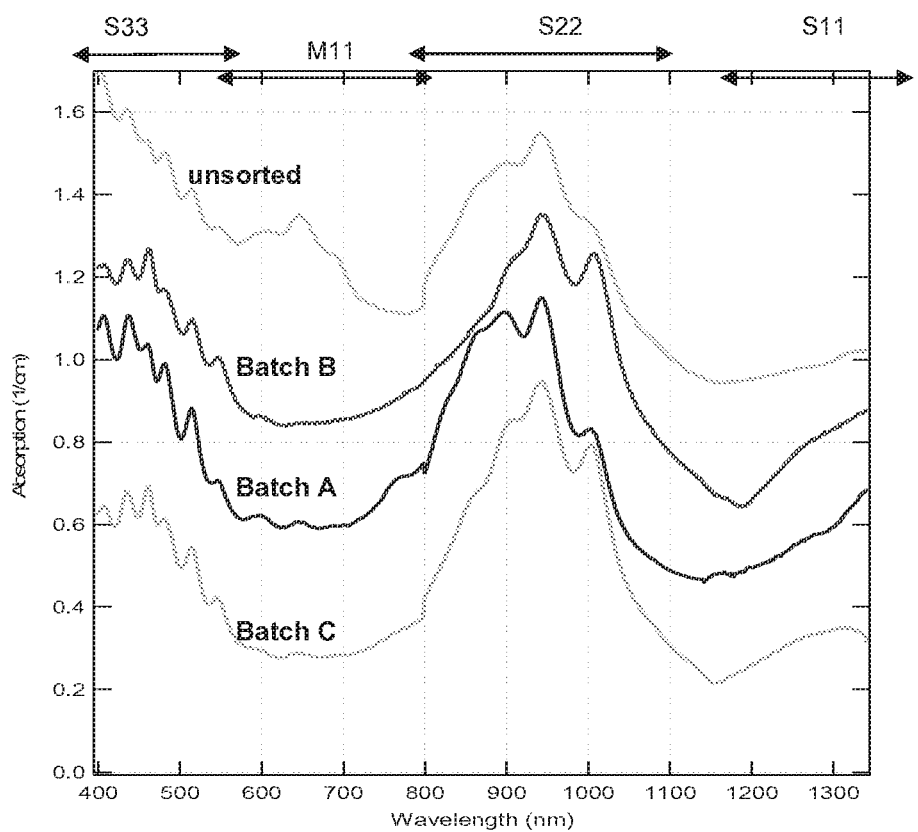
FIG. 19 compares the optical absorbance spectra of unsorted laser-ablation-synthesized SWNTs with sorted semiconducting laser-ablation-synthesized SWNTs, where the laser-ablation-synthesized SWNTs were obtained from three different sources: (a) raw, unpurified laser ablation-synthesized SWNTs obtained from Carbon Nanotechnologies, Inc. (Batch A); (b) nitric acid purified laser ablation-synthesized SWNTs obtained from IBM (Batch B); and (c) nitric acid purified laser-ablation-synthesized SWNTs obtained from IBM (Batch C).
Figure 22A:
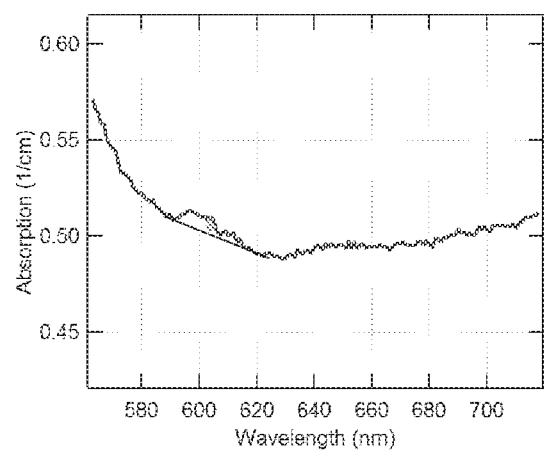
FIGS. 22A and 22B show the baseline subtraction for measuring the amplitudes of absorption for sorted semiconducting SWNTs.
Figure 22B:
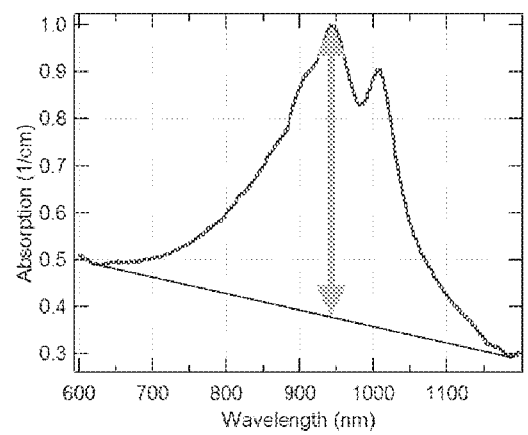
Figure 23A:
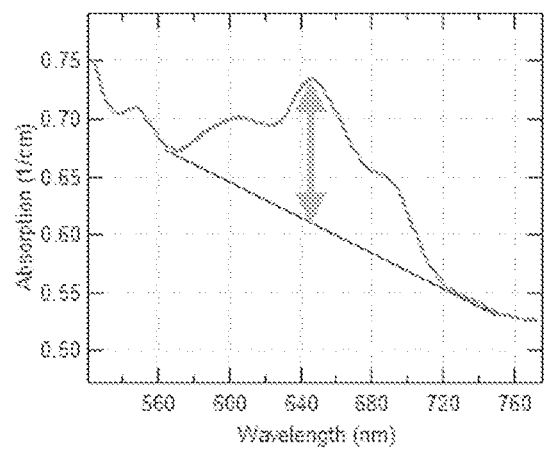
FIGS. 23A and 23B show the baseline subtraction for measuring the amplitudes of absorption for unsorted SWNTs.
Figure 23B:
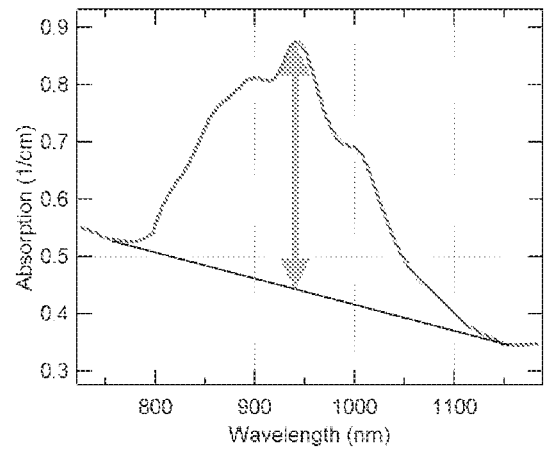

4. Separation Based on Electronic Type Demonstrated by Laser Ablation-Synthesized SWNTs of Different Sources FIG. 19 compares the optical absorbance spectra of unsorted laser-ablation-synthesized SWNTs with sorted semiconducting laser-ablation-synthesized SWNTs, where the laser-ablation-synthesized SWNTs were further obtained from three different sources: raw, unpurified laser ablation-synthesized SWNTs obtained from Carbon Nanotechnologies, Inc. (Batch A); nitric acid purified laser ablation-synthesized SWNTs obtained from IBM (Batch B); and nitric acid purified laser ablation-synthesized SWNTs obtained from IBM (Batch C). The three sorted spectra are comparable in their general profiles to the sample shown in FIGS. 16A and 16B. A strong isolation of semiconducting SWNTs was observed in each of the sorted spectra regardless of the source of the samples. However, while all the results were similar, subtle differences in the suppression of the metallic SWNTs are apparent. In addition, the enrichment of semiconducting SWNTs and the removal of metallic SWNTs appear to be better when nitric acid purified laser ablation-synthesized SWNTs were used (Batches B and C), and worse when raw, unpurified laser ablation-synthesized SWNTs were used (Batch A).

Example 4: Quantitative Analysis of Separation by Electronic Type

In this example, new spectra of primarily semiconducting and metallic laser ablation-synthesized SWNTs were obtained with improved signal-to-noise ratio. The sorted solutions were prepared using procedures analogous to those described in Example 3, Section B, but at a higher concentration which led to an improvement in the signal-to-noise ratio given a fixed background noise level.

FIG. 20 shows the optical absorption spectra of unsorted (as open star symbols), sorted metallic (as open triangles), and sorted semiconducting (as open diamond symbols) SWNTs. The asterisk symbol at about 900 nm identifies optical absorption from spurious semiconducting SWNTs. The asterisk symbol at about 600 nm identified optical absorption from spurious metallic SWNTs.

The amplitude of absorption from the M11 transitions (475-700 nm) and the S22 transitions (800-1150 nm) was used to determine the relative concentration of semiconducting and metallic SWNTs, respectively, in each sample (FIG. 20). The measured amplitude of absorption was determined by subtracting the background absorption, which was determined by linearly interpolating the background underneath an absorption peak. FIGS. 21A, 21B, 22A, 22B, 23A and 23B show the background baseline from which the amplitude of absorption was subtracted to obtain the measured amplitude. Because equal masses or concentrations of metallic and semiconducting SWNTs will have different strength of optical absorbance, the amplitude of absorption of metallic SWNTs first had to be scaled for relative comparison with the amplitude of absorption of semiconducting SWNTs. The scaling coefficient was determined from the unsorted sample, which was known to be composed of 66.7% semiconducting SWNTs and 33.3% metallic SWNTs.

Additionally, in determining the relative concentration of semiconducting and metallic SWNTs in each sample, three assumptions were made: (i) the mass of SWNTs is linearly proportional to the amplitude of optical absorption; (ii) the background absorption can be linearly interpolated; (iii) similar diameter ranges of SWNTs exist before and after sorting (dissimilar diameter ranges would affect width of absorption in the M11 and S22 ranges, invalidating assumption (i)).

Table 3 below shows that in the sample optimized for separation of metallic SWNTs (FIG. 20), 99.3% of the SWNTs were metallic and 0.7% of the SWNTs were semiconducting. In the sample optimized for separation of semiconducting SWNTs (FIG. 20), 97.4% of the SWNTs were semiconducting and 2.6% of the SWNTs were metallic.

TABLE 3

Relative concentration of sorted metallic and semiconducting SWNTs as determined from optical absorption spectra depicted in FIG. 20.

| | Data from measured optical spectra (measured amplitude of absorbance by linearly interpolating background absorbance) | | | | | | Calculated compositions (scaled by metallic renormalization coefficient) |
|---|---|---|---|---|---|---|---|
| | SORTED METALLIC | | | | | | |
| | Metallic Absorbance | | | Semiconducting Absorbance | | | Semiconducting nanotubes (mass) |
| | $\lambda$ (nm) | A | | $\lambda$ (nm) | A | | 0.7% |
| Bkgd 1 | 425 | 0.395 | | 839 | 0.126 | | Metallic nanotubes (mass) |
| Bkgd 2 | 750 | 0.166 | | 1069 | 0.075 | | 99.3% |
| Peak | 602 | 1 | 0.271 | 878 | 0.126 | 0.117 | |
| | Amplitude | | 0.729 | Amplitude | | 0.009 | |
| | SORTED SEMICONDUCTING | | | | | | |
| | Metallic Absorbance | | | Semiconducting Absorbance | | | Semiconducting nanotubes (mass) |
| | $\lambda$ (nm) | A | | $\lambda$ (nm) | A | | 97.4% |
| Bkgd 1 | 591 | 0.508 | | 623 | 0.491 | | Metallic nanotubes (mass) |
| Bkgd 2 | 620 | 0.491 | | 1182 | 0.296 | | 2.6% |
| Peak | 602 | 0.511 | 0.502 | 943 | 0.100 | 0.379 | |
| | Amplitude | | 0.009 | Amplitude | | 0.620 | |

TABLE 3-continued

Relative concentration of sorted metallic and semiconducting SWNTs as determined from optical absorption spectra depicted in FIG. 20.

| | Data from measured optical spectra (measured amplitude of absorbance by linearly interpolating background absorbance) | | | | | Calculated compositions (scaled by metallic renormalization coefficient) |
|---|---|---|---|---|---|---|
| UNSORTED | | | | | | |
| | Metallic Absorbance | | Semiconducting Absorbance | | | Semiconducting nanotubes (mass) |
| | λ (nm) | A | | λ (nm) | A | 66.7% |
| Bkgd 1 | 569 | 0.673 | | 759 | 0.528 | Metallic nanotubes (mass) |
| Bkgd 2 | 740 | 0.541 | | 1150 | 0.347 | 33.3% |
| Peak | 647 | 0.735 | 0.612 | 943 | 0.875 | 0.443 |
| | Amplitude | | 0.122 | Amplitude | | 0.432 |

*Metallic renormalization coefficient (calculated from unsorted sample to produce a 2:1 semiconducting to metallic ratio) = 1.77;
λ = wavelength;
A = Absorbance;
Bkgd = background.

Example 5: Determination of Typical Yields and Scales

Typical yields of sorting experiments can be estimated through optical absorbance spectra taken before and after each step of the separation process. During the initial dispersion of SWNTs in SC, roughly one quarter of the as-produced SWNT material is successfully encapsulated as either individual SWNTs or small bundles of SWNTs, with the remaining carbonaceous impurities, large SWNT aggregates, and insoluble species removed after the short centrifugation step. The solution processed SWNTs can then be incorporated into density gradients for sorting.

For each gradient, an average of 400 µL of SWNT solution (~250 µg mL$^{-1}$ SWNT loading) is infused into each centrifuge tube, resulting in ~100 µg of SWNT starting material per experiment. It is important to note, however, that this starting material consists of a mixture of individually encapsulated SWNTs, which can be sorted by diameter and electronic type, and of small bundles of SWNTs, for which such separation is unlikely. As a result, the yield of the separation experiments is highly dependent on the efficient encapsulation of individual SWNTs by surfactant.

Figure 24A:
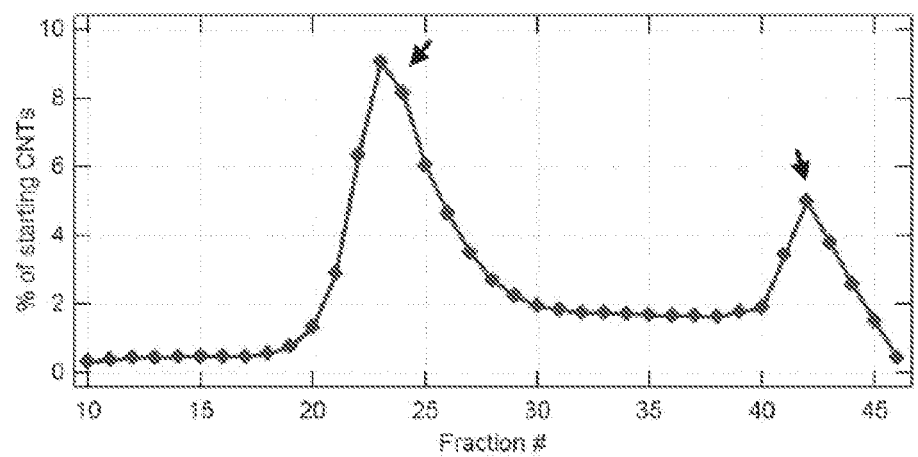
FIGS. 24A and 24B show typical yields of sorting experiments by plotting the percentage of starting SWNTs against fraction number. The data points in FIG. 24A correspond to the starting material-normalized absorbance at 942 nm (S22) in the 1:4 SDS:SC sorting experiment for semiconducting laser-ablation-synthesized SWNTs (FIGS. 16A and 16B). The left-most arrow points to the orange band of semiconducting SWNTs (FIG. 16A) and the right-most arrow points to the black aggregate band (towards the bottom of the centrifuge in FIG. 16A). The data points in FIG. 24B correspond to the starting material-normalized absorbance at 982 nm (the first order transition for the (6, 5) chirality) in the SC sorting experiment for CoMoCAT-grown SWNTs (FIGS. 7A and 7B) based on diameter. The arrow points to the magenta band (FIG. 7B).
Figure 24B:
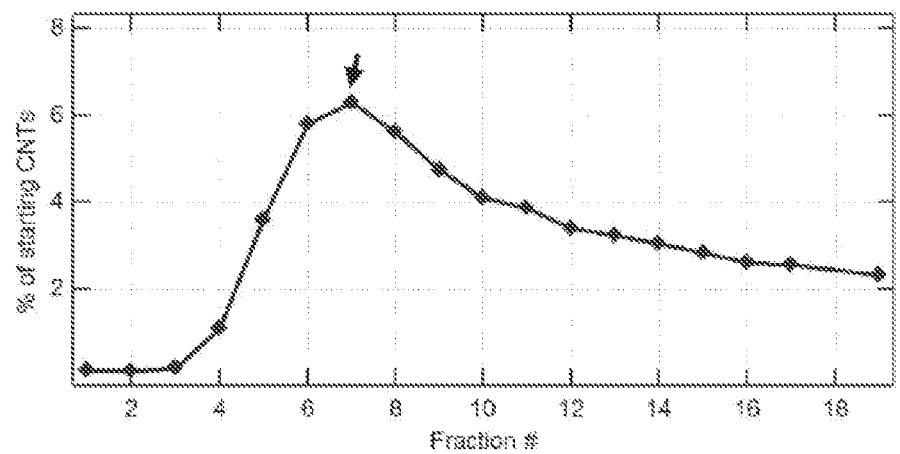

The allocation of the starting SWNT material to points in the density gradient after sorting can be estimated by optical absorbance spectra of the fractionated material. This approximate yield is calculated by collecting the absorbance of each fraction at a wavelength of interest and normalizing by the absorbance of the starting solution at the same wavelength. For instance, for laser-ablation-grown SWNTs, we can assess the yield of semiconducting nanotubes in the 1:4 SDS:SC sorting experiment (FIGS. 16A and 16B) by tracking the starting material-normalized absorbance at 942 nm, which corresponds to the peak of the second order semiconductor transitions (FIG. 24A). The peak semiconducting fraction contains >9% of the starting material (~9 µg), corresponding to an overall yield of approximately 2.3%. An analogous analysis for CoMoCAT diameter separation in sodium cholate (FIGS. 7A and 7B) scanning the optical absorbance at 982 nm (FIG. 24B), the first order transition for the (6, 5) chirality, reveals that >6% of the starting material (~6 µg) is contained in the fraction with the highest overall yield of approximately 1.5%.

Despite the modest yields reported above, a more reasonable measure of the experimental outcome taking into account only individually encapsulated SWNTs, excluding bundles incapable of being sorted, could increase the stated yields by factors of two to five. Additionally, fractions with highly isolated distributions of SWNTs are generally located above and below the fractions with the peak yields; thus, combining this sorted material can further improve the sorting efficiency. Moreover, the mass of sorted material produced can be increased three to five times by concentrating the SWNT solution prior to separation as described in the Concentration of SWNTs in step gradients section in Example 1.

Although the methods described herein only succeed in producing microgram quantities of sorted SWNT materials, there are definite ways in which the methods of the present teachings could be expanded to an industrial scale. For instance, by employing a large-volume, industrial centrifuge capable of g-forces comparable to the centrifuge used, it could be possible to sort over a gram of SWNTs at a time. Such centrifuges can accommodate 8 L of solution, enabling 1 L of SWNT solution to be sorted in a 7 L density gradient. If the efficiency of individual SWNT encapsulation is increased and/or the solution is strongly concentrated prior to sorting, the 1 L of solution could be loaded with 4 g of isolated SWNTs. Thus, in a single 12 hour centrifugation, gram quantities of SWNTs could be sorted according to diameter and/or electronic type. Multiple centrifugations can be run in parallel and/or in series, and their resultant yields can be added together to achieve kilogram quantities or more of sorted SWNTs.

Example 6: Fabrication of FETs Using Sorted Metallic and Semiconducting SWNTs In order to demonstrate the applicability of SWNTs separated in density gradients and to confirm their purification by electronic type, field-effect transistors (FETs) were fabricated consisting of percolating networks of thousands of metallic or semiconducting SWNTs. FIG. 25A shows a periodic array of source and drain electrodes (scale bar 40 µm, gap 20 µm). FIG. 25B is a representative atomic force microscopy (AFM) image of a percolating SWNT network (scale bar=1 µm). The density of SWNTs per unit area is >10 times the percolation limit. FIG. 25C shows the geometry of the field-effect transistors (FETs) fabricated (s=source; g=gate; d=drain).

Fabrication of Electrical Devices

Electrical devices were fabricated from percolating networks of semiconducting and metallic SWNTs. The percolating networks were formed via vacuum filtration of the purified SWNTs dispersed in surfactant solutions through porous mixed cellulose ester (MCE) membranes (0.02 µm, Millipore Corporation) following the methods of Wu et al. (Z. C. Wu et al., *Science* 305, 1273 (2004)). After filtration of the SWNT solution, the network was allowed to dry for 30 minutes to set and then was rinsed by 10-20 mL of deionized water to remove residual surfactant and iodixanol from the network, leaving a network of bare SWNTs behind.

The networks on top of the MCE membranes were then transferred to Si (100) substrates capped with 100 nm thermally-grown $SiO_2$ (Silicon Quest International). The MCE membrane was wet with deionized water and pressed into the $SiO_2$ surface (SWNTs in contact with $SiO_2$) for 2 minutes between two glass slides. The slides were removed and the MCE membranes were allowed to dry for several minutes on the $SiO_2$ substrates. The substrates were then rinsed in 3 sequential acetone baths for 15 minutes each to dissolve the MCE membranes, followed by a rinse in methanol. Then, the networks of SWNTs on the substrates were blown dry in a stream of $N_2$ gas.

The densities (SWNTs per unit area) of the networks were controlled by adjusting the volume of the fractions of SWNTs that were filtered. Quantitative measurements of the network densities were determined by measuring the optical density of the SWNTs in solution before filtration and via atomic force microscopy (AFM) after filtration and subsequent transfer to substrates.

Arrays of electrodes (Au, 30 nm) were lithographically defined on top of the percolating networks using a TEM grid as a shadow mask (300 mesh, Cu, SPI Supplies, West Chester, Pa.; pitch 83 µm, bar width 25 µm) in an e-beam evaporator. After evaporation, the substrates were then rinsed in acetone, 2-propanol, and then water, followed by annealing at 225° C. in air for 20 minutes.

The percolating networks of metallic and semiconducting SWNTs were electrically characterized in a field-effect transistor (FET) geometry using two source-meter units (KE2400, Keithley, Inc.). A gate bias was applied to the underlying Si substrate, which served as the gate electrode, to modulate the carrier concentration in the SWNT network. A bias of up to 5 V was applied between two of the neighboring electrodes, created from the TEM grid shadow mask, which served as the source and drain. The gate leakage current and the source-drain current were both measured. In all cases, the source-drain current significantly exceeded the gate leakage current. Sweeps of the gate bias were made from negative to positive bias. Hysteresis was observed depending on the sweep direction due to the presence of mobile charge, an effect routinely observed in SWNT FET devices fabricated on 100 nm thick $SiO_2$ gate dielectrics.

Measurement of Percolation Density of the SWNT Networks

Figure 26A:
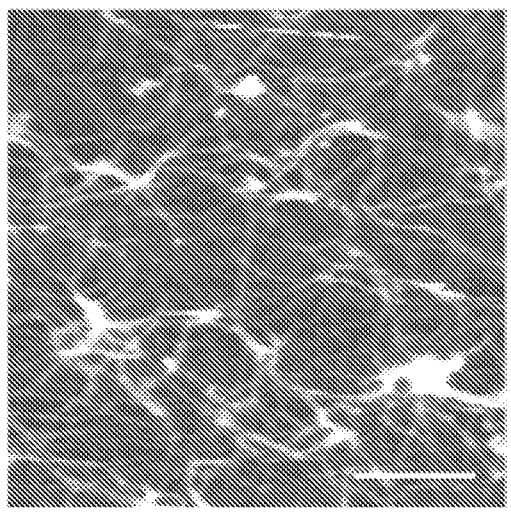
FIG. 26A is an image of semiconducting network acquired by AFM (scale bar 0.5 µm).
Figure 26B:
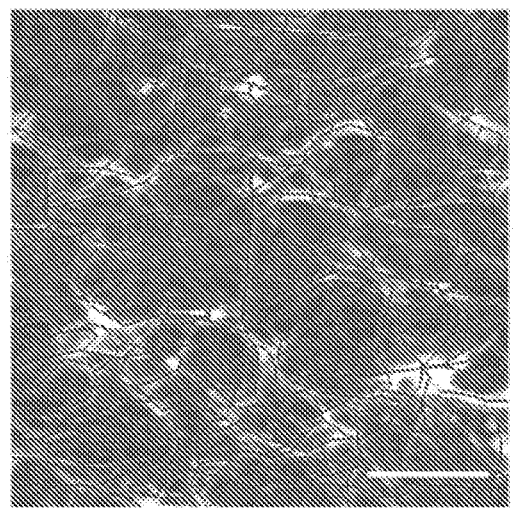
FIG. 26B shows the same image with conducting pathways due to SWNTs traced in black.

For each percolating network, several devices were characterized via contact mode AFM (512×512 resolution, 3-20 µm image sizes, contact force <10 nN). During imaging, the contact force was kept at a minimum to limit the mechanical perturbation of the network. The images of the networks were analyzed to determine the percolation density (SWNTs per unit area). Each percolating pathway was traced to determine the total pathway length per unit area of the network (FIGS. 26A and 26B). In FIGS. 26A and 26B, an image and trace, respectively, of the thin film, semiconducting network (electrically characterized in FIG. 25D) are shown. The trace corresponds to 22.1 µm of conducting pathway per square µm of the substrate. For an average SWNT length of 0.45 µm (average length determined from additional AFM studies of laser-ablation grown SWNTs separated in density gradients and then isolated on substrates), this corresponds to a percolation density of ~50 SWNTs/µm$^2$, about 10 times larger than the percolation threshold, ~5 SWNTs/µm$^2$. The measured percolation density of ~50 SWNTs/µm$^2$ is an underestimate because it does not account for multiple SWNTs per pathway due to the possibility of overlapping SWNTs or small bundles. Such effects are anticipated as a result of the large van der Waals attraction expected among SWNTs once their encapsulating surfactant has been rinsed away during the film formation. The semiconducting networks were created first and then characterized electrically and via AFM. Then, to make comparison between the metallic and semiconducting networks equitable, the metallic networks were created such that their percolation densities were equal to or less than the semiconducting network.

Their average characteristics are plotted in (FIG. 25D). Error bars depict two standard deviations. (For semiconducting devices n=4; metallic devices n=3).

The electronic mobility of the semiconducting SWNT networks was estimated by fitting the source-drain current versus the gate bias for a fixed source-drain bias in the "on" regime ($V_g<V_T$) of the FETs to a straight line (FIG. 25D, inset). The following relationship was used: $I_{ds}=\mu C_{ox}*(W/L)*(V_g-V_t)*V_{ds}$ where $I_{ds}$ is the source-drain current, µ is the mobility, $C_{ox}$ is the oxide capacitance, W is the channel width, L is the channel thickness, $V_g$ is the gate bias, $V_t$ is the gate threshold bias, and $V_{ds}$ is the source-drain bias.

An upper bound on the capacitance between the SWNT networks and the Si substrate was determined by assuming a parallel plate capacitor geometry (L, W of 20, 63 µm). The linear fit yields a lower bound for mobility µ of >20 cm$^2$ V$^{-1}$ s$^{-1}$ (which is comparable to previously reported mobilities for thin films of as-synthesized mixtures of metallic and semiconducting SWNTs near their percolation threshold) and a gate threshold voltage of –20 V. The fit on the mobility is a lower bound because the assumption of parallel plate capacitance is drastically overestimating the capacitance, as the SWNT network occupies only a fraction of the channel area. Furthermore, resistive losses at the contacts were not taken into account.

Distinctive Behaviors of the Semiconducting and Metallic Films

At negative gate biases, it was observed that both networks exhibited similar sheet resistances of about 500 kΩ square$^{-1}$. However, by varying the voltage applied across the gate dielectric capacitor (100 nm $SiO_2$), the resistivity of the semiconducting network was increased by over 4 orders of magnitude (on/off ratio >20,000). In contrast, the metallic networks were significantly less sensitive to the applied gate bias characterized by on/off ratios of less than two (switching ratios larger than 1 may indicate perturbations to the electronic band-structure of the metallic SWNTs at tube-endpoints or tube-tube contacts or resulting from tube-bending or chemical defects). The two distinct behaviors of the semiconducting and metallic films independently confirm the separation by electronic type initially observed by optical absorption spectroscopy (FIG. 17). Additionally, the two films establish the applicability of the method of the present teachings in producing usable quantities of purified, functional material. For example, a single fraction of purified semiconducting SWNTs (150 µL) contains enough SWNTs for 20 cm$^2$ of a thin film network similar to that demonstrated in FIGS. 25A-25D, corresponding to >10$^{11}$ SWNTs. According to the present teachings, a population of SWNTs can include about 10 or more SWNTs, such as >10 SWNTs, >50 SWNTs, >100 SWNTs, >250 SWNTs, >500 SWNTs, >10$^3$ SWNTs, >10$^4$ SWNTs, >10$^5$ SWNTs, >10$^6$ SWNTs, >10$^7$ SWNTs, >10$^8$ SWNTs, >10$^9$ SWNTs, >10$^{10}$ SWNTs, or >10$^{11}$ SWNTs. Further, by weight, a population of SWNTs can have a mass of about 0.01 µg, such as >0.01 µg, >0.1 µg, >1 µg, >0.01 mg, >0.1 mg, >1 g, >10 g, or >100 g. Such thin film networks have applications as flexible and transparent semiconductors and conductors. As would be understood by those skilled in the art, such characterization, under conditions of the sort described herein, can reflect SWNT quantities in accordance herewith. Such quantities are representative of bulk SWNTs available through the present teachings, and can be a further distinction over prior art methods and materials.

The present teachings can be embodied in other specific forms, not delineated in the above examples, without departing from the spirit or essential characteristics thereof. The present teachings can be embodied in other specific forms without departing from the spirit or essential characteristics thereof. The foregoing embodiments are therefore to be considered in all respects illustrative rather than limiting on the present teachings described herein. Scope of the invention is thus indicated by the appended claims rather than by the foregoing description, and all changes that come within the meaning and range of equivalency of the claims are intended to be embraced therein.

We claim:

1. A population of loose single-walled carbon nanotubes, wherein greater than about 90% of the population is metallic single-walled carbon nanotubes and the single-walled carbon nanotubes are unmodified chemically or structurally.

2. The population of single-walled carbon nanotubes of claim 1, wherein greater than about 97% of the population is metallic single-walled carbon nanotubes.

3. The population of single-walled carbon nanotubes of claim 2, wherein the single-walled carbon nanotubes have a diameter greater than 11 Å.

4. The population of single-walled carbon nanotubes of claim 1, wherein greater than about 99% of the population is metallic single-walled carbon nanotubes.

5. The population of single-walled carbon nanotubes of claim 4, wherein the single-walled carbon nanotubes have a diameter greater than 11 Å.

6. The population of single-walled carbon nanotubes of claim 1 dispersed in a liquid medium comprising two surface active components of different types.

7. The population of single-walled carbon nanotubes of claim 1, wherein the single-walled carbon nanotubes have a diameter greater than 11 Å.

8. An article of manufacture comprising the population of single-walled carbon nanotubes of claim 1.

9. An article of manufacture comprising the population of single-walled carbon nanotubes of claim 2.

10. An article of manufacture comprising the population of single-walled carbon nanotubes of claim 4.

11. An article of manufacture comprising the population of single-walled carbon nanotubes of claim 7.

12. An article of manufacture comprising the population of single-walled carbon nanotubes of claim 3.

13. An article of manufacture comprising the population of single-walled carbon nanotubes of claim 5.

14. A transparent conductive film comprising the population of single-walled carbon nanotubes of claim 1.

15. A transparent conductive film comprising the population of single-walled carbon nanotubes of claim 2.

16. A transparent conductive film comprising the population of single-walled carbon nanotubes of claim 4.

17. A transparent conductive film comprising the population of single-walled carbon nanotubes of claim 7.

18. A transparent conductive film comprising the population of single-walled carbon nanotubes of claim 3.

19. A transparent conductive film comprising the population of single-walled carbon nanotubes of claim 5.

20. A population of loose single-walled carbon nanotubes, wherein greater than about 90% of the population is metallic single-walled carbon nanotubes having a diameter greater than 11 Å, the single-walled carbon nanotubes are not grown on or adhered to a substrate, and the single-walled carbon nanotubes are unmodified chemically or structurally.

21. The population of single-walled carbon nanotubes of claim 20, wherein greater than about 97% of the population is metallic single-walled carbon nanotubes.

22. The population of single-walled carbon nanotubes of claim 21, wherein the single-walled carbon nanotubes are bare.

23. An article of manufacture comprising the population of single-walled carbon nanotubes of claim 20.

24. An article of manufacture comprising the population of single-walled carbon nanotubes of claim 21.

25. An article of manufacture comprising the population of single-walled carbon nanotubes of claim 22.

26. A population of loose single-walled carbon nanotubes, wherein greater than about 99% of the population is metallic single-walled carbon nanotubes, the single-walled carbon nanotubes are not grown on or adhered to a substrate, and the single-walled carbon nanotubes are unmodified chemically or structurally.

27. The population of single-walled carbon nanotubes of claim 26, wherein the single-walled carbon nanotubes have a diameter greater than 11 Å.

28. The population of single-walled carbon nanotubes of claim 27, wherein the single-walled carbon nanotubes are bare.

29. An article of manufacture comprising the population of single-walled carbon nanotubes of claim 26.

30. An article of manufacture comprising the population of single-walled carbon nanotubes of claim 28.

* * * * *